US012789630B2

(12) United States Patent
Kamio et al.

(10) Patent No.: US 12,789,630 B2
(45) Date of Patent: Nov. 10, 2026

(54) VEHICLE CONTROL DEVICE, VEHICLE CONTROL METHOD, AND VEHICLE CONTROL PROGRAM

(71) Applicant: DENSO CORPORATION, Kariya-city (JP)

(72) Inventors: Shigeru Kamio, Kariya-city (JP); Akihiro Takahashi, Kariya-city (JP); Haibo Liu, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 239 days.

(21) Appl. No.: 18/665,076

(22) Filed: May 15, 2024

(65) Prior Publication Data

US 2024/0383336 A1 Nov. 21, 2024

(30) Foreign Application Priority Data

May 16, 2023 (JP) ................................ 2023-081133

(51) Int. Cl.
*B60L 3/00* (2019.01)

(52) U.S. Cl.
CPC ......... *B60L 3/0061* (2013.01); *B60L 2240/12* (2013.01); *B60L 2240/423* (2013.01); *B60L 2240/425* (2013.01); *B60L 2240/429* (2013.01)

(58) Field of Classification Search
CPC ........ B60L 3/0061; B60L 50/15; B60L 15/20; H02P 6/16; H02P 21/34; H02P 21/14; H02P 27/08; H02P 21/22; H02P 29/68; H02P 29/02; H02P 25/024; H02P 23/26; G01R 19/0092; G01R 1/203; B60W 10/08; B60W 20/00; B60W 20/10; B60W 10/06; B60K 6/445; B60K 6/383
See application file for complete search history.

(56) References Cited

U.S. PATENT DOCUMENTS

| | | | |
|---|---|---|---|
| 2004/0065490 | A1 | 4/2004 | Saito et al. |
| 2012/0185143 | A1 | 7/2012 | Ohno |
| 2013/0282220 | A1 | 10/2013 | Tachikawa |
| 2019/0135103 | A1 | 5/2019 | Kuze et al. |

FOREIGN PATENT DOCUMENTS

| | | | |
|---|---|---|---|
| JP | H09-215388 | A | 8/1997 |
| JP | 2001-320802 | A | 11/2001 |
| JP | 2007-001573 | A | 1/2007 |
| JP | 2007-325417 | A | 12/2007 |
| JP | 2008-301547 | A | 12/2008 |

(Continued)

*Primary Examiner* — Said Bouziane
(74) *Attorney, Agent, or Firm* — Oliff PLC

(57) ABSTRACT

A vehicle control device includes a step drive over control section that performs a step drive over control for a vehicle to drive over a step, a protection control section that performs a protection control to protect a rotating electric machine that drives the vehicle by suppressing the rotating electric machine from overheating, a temperature acquisition section that acquires the temperature of the rotating electric machine, and an execution deferment section that defers an execution of the protection control until a predetermined period has elapsed if the temperature of the rotating electrical machine becomes equal to or higher than a first threshold value at which the protection control should be executed while the vehicle is performing the step drive over control.

6 Claims, 16 Drawing Sheets

(56) References Cited

FOREIGN PATENT DOCUMENTS

| | | | | |
|---|---|---|---|---|
| JP | 2010-130890 | A | | 6/2010 |
| JP | 2011-166996 | A | | 8/2011 |
| JP | 2012100435 | A | * | 5/2012 |
| JP | 2013-127411 | A | | 6/2013 |
| JP | 2013-132137 | A | | 7/2013 |
| JP | 2013-159327 | A | | 8/2013 |
| JP | 2013-172626 | A | | 9/2013 |
| JP | 2013-244781 | A | | 12/2013 |
| JP | 2014-187779 | A | | 10/2014 |
| JP | 2016-144245 | A | | 8/2016 |
| JP | 2017-028961 | A | | 2/2017 |
| JP | 2017-166340 | A | | 9/2017 |
| JP | 2020-150649 | A | | 9/2020 |
| JP | 2020-162189 | A | | 10/2020 |

* cited by examiner

VEHICLE CONTROL DEVICE, VEHICLE CONTROL METHOD, AND VEHICLE CONTROL PROGRAM

CROSS-REFERENCE TO RELATED APPLICATION

This application is based on and claims the benefit of priority from earlier Japanese Patent Application No. 2023-081133 filed on May 16, 2023, the descriptions of all of which are incorporated herein by reference.

TECHNICAL FIELD

The present disclosure relates to a vehicle control device, a vehicle control method, and a vehicle control program.

BACKGROUND

JP 2019-85001 A1 discloses a control device for vehicles including a first electric motor having a plurality of energized phases and generating torque by controlling an electric current value energizing each of the plurality of energized phases in accordance with a rotation angle, an actuator capable of outputting torque to keep the vehicle stationary, and a switching mechanism capable of switching between an engaged state in which the torque output by the first electric motor is transmitted to driven wheels and a released state in which the torque is cut off in a transmission path. The control device further including a controller that controls the actuator and the switching mechanism, and if it is determined that the thermal load of any one of the plurality of energized phases is above a predetermined value by outputting a predetermined torque and maintaining the vehicle in a stopped state while the rotation of the first electric motor is stopped, the controller is configured to perform energizing phase change control to change the rotation angle of the first electric motor to decrease the thermal load of the predetermined energizing phase, and the energized phase change control is configured to be performed during the switching mechanism is switched to the released state and the actuator is outputting torque to maintain the vehicle in the stopped state.

SUMMARY

According to a first aspect of the present disclosure, a vehicle control device includes a step drive over control section configured to perform a step drive over control for a vehicle to drive over a step, a protection control section configured to perform a protection control to protect a rotating electric machine that drives the vehicle by suppressing the rotating electric machine from overheating, a temperature acquisition section configured to acquire the temperature of the rotating electric machine, and an execution deferment section configured to defer execution of the protection control until a predetermined period has elapsed if the temperature of the rotating electrical machine becomes equal to or higher than a first threshold value at which the protection control should be executed while the vehicle is performing the step drive over control.

According to a second aspect of the present disclosure, a vehicle control method is provided, wherein at least one processor performs a process of performing a step drive over control for a vehicle to drive over a step, performing a protection control to protect a rotating electric machine that drives the vehicle by suppressing the rotating electric machine from overheating, acquiring the temperature of the rotating electric machine, and deferring an execution of the protection control until a predetermined period has elapsed if the temperature of the rotating electrical machine becomes equal to or higher than a first threshold value at which the protection control should be executed while the vehicle is performing the step drive over control.

According to a third aspect of the present disclosure, a vehicle control program is provided that causes at least one processor to perform processing including a process of performing a step drive over control for a vehicle to drive over a step, performing a protection control to protect a rotating electric machine that drives the vehicle by suppressing the rotating electric machine from overheating, acquiring the temperature of the rotating electric machine, and deferring an execution of the protection control until a predetermined period has elapsed if the temperature of the rotating electrical machine becomes equal to or higher than a first threshold value at which the protection control should be executed while the vehicle is performing the step drive over control.

According to a fourth aspect of the present disclosure, a vehicle control device includes one or more processors, a memory storing instructions that when executed by the one or more processors causes the vehicle control device to perform processes including a step drive over control process which performs a step drive over control for a vehicle to drive over a step, a protection control process which performs a protection control to protect a rotating electric machine that drives the vehicle by suppressing the rotating electric machine from overheating, a temperature acquisition process which acquires the temperature of the rotating electric machine, and an execution deferment process which defers an execution of the protection control until a predetermined period has elapsed if the temperature of the rotating electrical machine becomes equal to or higher than a first threshold value at which the protection control should be executed while the vehicle is performing the step drive over control.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
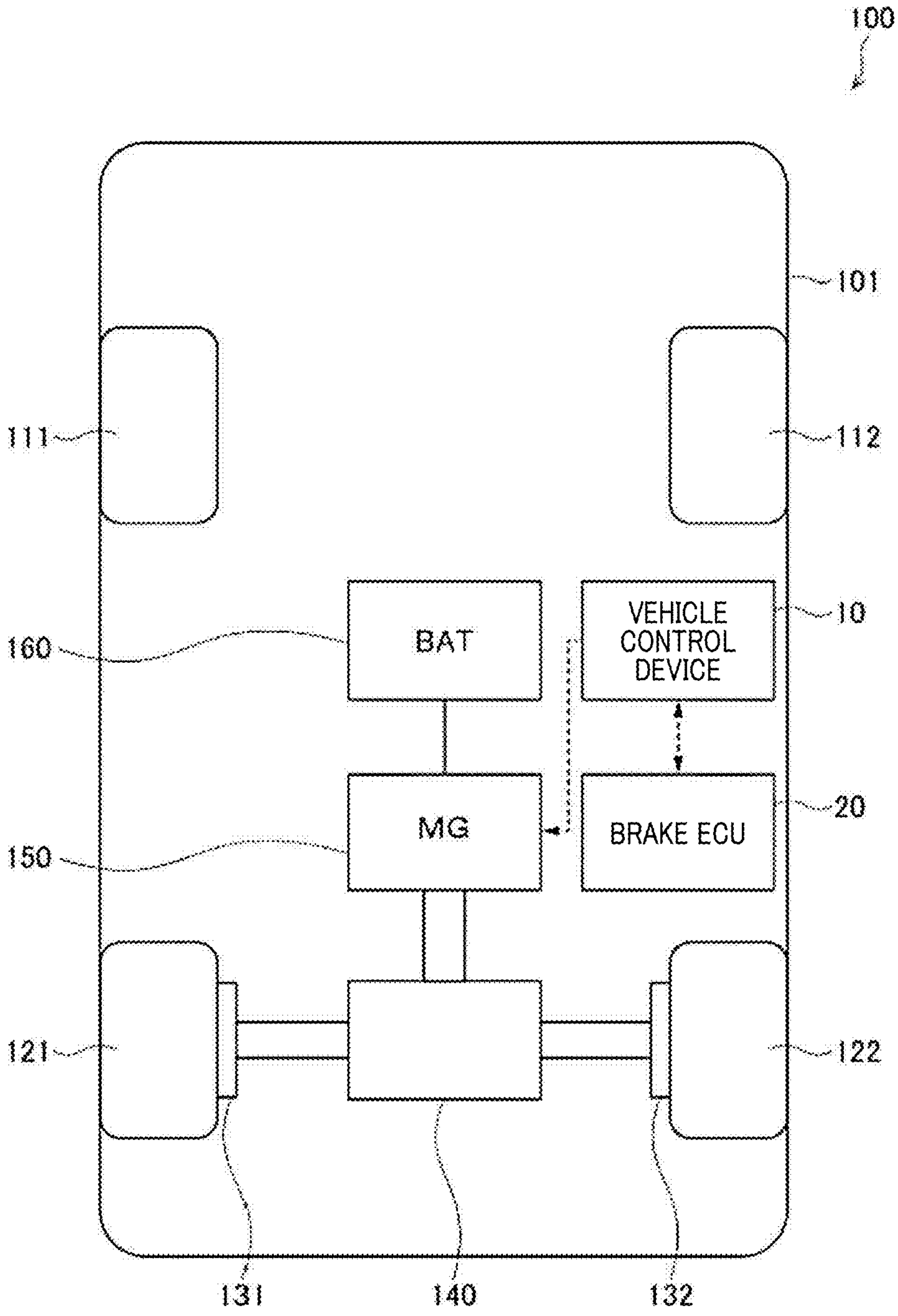
FIG. 1 shows a schematic diagram of a vehicle configuration.

JP 2019-85001 A1 discloses a technology that can output reaction force against a vehicle slipping downward while avoiding overheating of the motor and inverter.

In addition, since a drive source such as the motor or inverter may become overheated due to overload operation when the vehicle drives over a step, an overheat protection control may be executed to protect the drive source. If the overheat protection control is executed when the vehicle is overriding the step, hunting occurs, in which the torque-limited state and the torque-unlimited state are repeated. For this reason, there is a problem that drivability may deteriorate. In addition, there is a problem that it is sometimes difficult to drive over the step smoothly, for example, the vehicle cannot not drive over the step due to the torque limitation or the vehicle popping out after overriding the step.

The purpose of the present disclosure is to provide a vehicle control device, a vehicle control method, and a vehicle control program that can smoothly drive over a step while suppressing the deterioration of drivability.

According to a first aspect of the present disclosure, a vehicle control device includes a step drive over control section configured to perform a step drive over control for a vehicle to drive over a step, a protection control section configured to perform a protection control to protect a rotating electric machine that drives the vehicle by suppressing the rotating electric machine from overheating, a temperature acquisition section configured to acquire the temperature of the rotating electric machine, and an execution deferment section configured to defer execution of the protection control until a predetermined period has elapsed if the temperature of the rotating electrical machine becomes equal to or higher than a first threshold value at which the protection control should be executed while the vehicle is performing the step drive over control.

According to a second aspect of the present disclosure, a vehicle control method is provided, wherein at least one processor performs a process of performing a step drive over control for a vehicle to drive over a step, performing a protection control to protect a rotating electric machine that drives the vehicle by suppressing the rotating electric machine from overheating, acquiring the temperature of the rotating electric machine, and deferring an execution of the protection control until a predetermined period has elapsed if the temperature of the rotating electrical machine becomes equal to or higher than a first threshold value at which the protection control should be executed while the vehicle is performing the step drive over control.

According to a third aspect of the present disclosure, a vehicle control program is provided that causes at least one processor to perform processing including a process of performing a step drive over control for a vehicle to drive over a step, performing a protection control to protect a rotating electric machine that drives the vehicle by suppressing the rotating electric machine from overheating, acquiring the temperature of the rotating electric machine, and deferring an execution of the protection control until a predetermined period has elapsed if the temperature of the rotating electrical machine becomes equal to or higher than a first threshold value at which the protection control should be executed while the vehicle is performing the step drive over control.

According to a fourth aspect of the present disclosure, a vehicle control device includes one or more processors, a memory storing instructions that when executed by the one or more processors causes the vehicle control device to perform processes including a step drive over control process which performs a step drive over control for a vehicle to drive over a step, a protection control process which performs a protection control to protect a rotating electric machine that drives the vehicle by suppressing the rotating electric machine from overheating, a temperature acquisition process which acquires the temperature of the rotating electric machine, and an execution deferment process which defers an execution of the protection control until a predetermined period has elapsed if the temperature of the rotating electrical machine becomes equal to or higher than a first threshold value at which the protection control should be executed while the vehicle is performing the step drive over control.

According to the present disclosure, it has the effect of enabling the driver to drive over a step smoothly while suppressing the deterioration of drivability.

The following is a description of the present embodiment with reference to the accompanying drawings. For ease of understanding, identical components are indicated with the same reference numbers/symbols in each drawing to the extent possible, and redundant explanations are omitted.

A vehicle control device 10 is installed in a vehicle 100 and is configured as a device for controlling the vehicle 100. Prior to the description of the vehicle control device 10, the configuration of the vehicle 100 is first described with reference to FIG. 1.

The vehicle 100 is a vehicle that travels based on an operation of a driver. However, some driving operations (e.g., braking) may be performed automatically by the vehicle control device 10, such as when a wheel contacts a step. The vehicle 100 includes a vehicle body 101, wheels 111, 112, 121, 122, a rotating electric machine 150, and a battery 160.

The vehicle body 101 is a main body part of the vehicle 100. The wheel 111 is a wheel on the front left part of the vehicle body 101, and the wheel 112 is a wheel on the front right part of the vehicle body 101. The front wheels 111 and 112 are the non-driven wheels in the present embodiment.

The wheel 121 is a wheel on the rear left part of the vehicle body 101, and the wheel 122 is a wheel on the rear right part of the vehicle body 101. The rear wheels 121 and 122 are the driven wheels in the present embodiment. In other words, the wheels 121 and 122 are rotated by the torque of the rotating electric machine 150, described later, to drive the vehicle 100.

In this way, the vehicle 100 is configured as a so-called rear-wheel drive vehicle. Instead of this, the vehicle 100 may be configured as a front-wheel drive vehicle or as a four-wheel drive vehicle. In a latter case, in addition to the 150 rotating electric machines for driving the rear wheels, a separate rotating electric machine may be provided to drive the front wheels.

The wheel 121 is equipped with a brake device 131, and the wheel 122 is equipped with a brake device 132. Both brake devices 131 and 132 are braking devices that apply braking force to the wheels through hydraulic pressure. Such a brake device may be provided not only on the driven wheels, but also on the wheels 111 and 112, which are the non-driven wheels. An operation of the brake devices 131 and 132 is controlled by a brake ECU 20 described later.

The rotating electric machine 150 is a device that receives a supply of electric power from the battery 160, described later, to produce the torque to rotate the wheels 121 and 122, i.e., the torque necessary for the vehicle 100 to travel. The rotating electrical machine 150 is a so-called motor generator as an example. The torque produced by the rotating electric machine 150 is transmitted to each of the wheels 121 and 122 via a powertrain section 140 to rotate the wheels 121 and 122. Note that the transfer of electric power between the battery 160 and the rotating electric machine 150 is performed via an inverter, which is a power converter, however the inverter is not shown in FIG. 1.

The rotating electric machine 150 can produce the torque to accelerate the vehicle 100 as well as braking force to decelerate the vehicle 100 through regeneration. The braking of the vehicle 100 can be performed by the rotating electric machine 150 or by the previously mentioned brake devices 131 and 132.

The battery 160 is a storage battery for supplying drive power to the rotating electrical machine 150. In the present embodiment, a lithium-ion battery is used as the battery 160 as an example. During braking, the regenerative power generated by the rotating electric machine 150 is supplied to the battery 160 via an unshown inverter to charge the battery 160.

The vehicle 100 includes the brake ECU 20 separate from the vehicle control device 10. Both the vehicle control device 10 and the brake ECU 20 are configured as computer systems with CPU, ROM, RAM, etc. They can communicate bidirectionally with each other via a network installed in the vehicle 100. It should be noted that the details of the hardware configuration of the vehicle control device 10 are described later.

The brake ECU 20 performs the process of controlling the operation of the brake devices 131 and 132 in response to instructions from the vehicle control device 10.

Note that the vehicle control device 10 and the brake ECU 20 do not have to be separated into two devices as in the present embodiment. For example, the functions of the brake ECU 20 may be integrated into the vehicle control device 10. In realizing the functions of the vehicle control device 10 described later, the specific device configuration is not limited.

Figure 2:
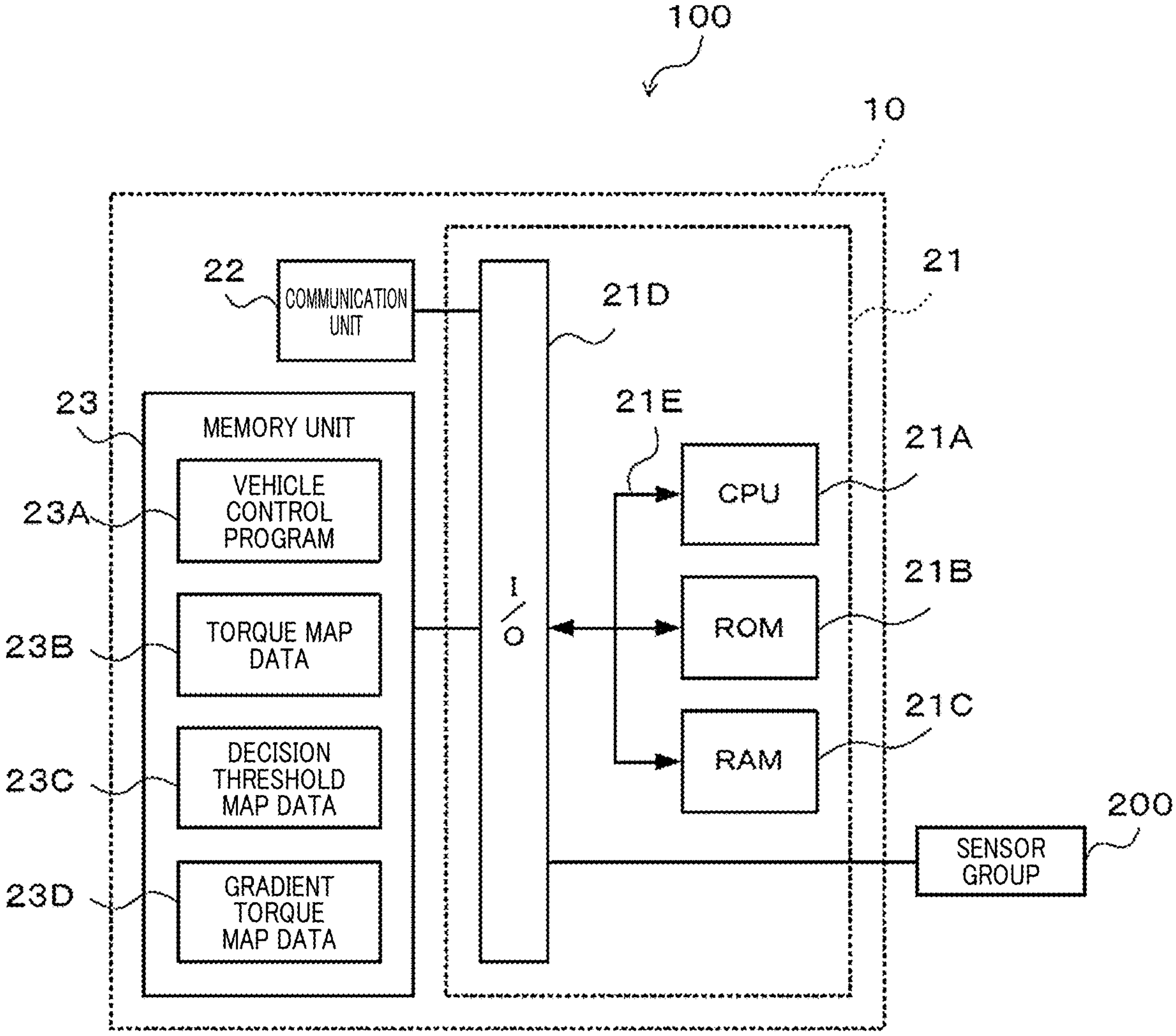
FIG. 2 shows a block diagram of a hardware configuration of a vehicle control device.

FIG. 2 is a block diagram showing the hardware configuration of the vehicle control device 10. As shown in FIG. 2, the vehicle control device 10 has a control unit 21. The control unit 21 consists of a device containing a common computer.

As shown in FIG. 2, the control unit 21 has a central processing unit (CPU) 21A, a read only memory (ROM) 21B, a random-access memory (RAM) 21C, and an input/output interface (I/O) 21D. Then, the CPU 21A, the ROM 21B, the RAM 21C, and the I/O 21D are each connected via a bus 21E. The bus 21E includes a control bus, an address bus, and a data bus.

In addition, a communication unit 22, a memory unit 23, and a sensor group 200 including various sensors are connected to the I/O 21D.

The communication unit 22 is an interface for communication with external devices such as the brake ECU 20 and the rotating electrical machine 150.

The memory unit 23 consists of a non-volatile external storage device such as a hard disk. As shown in FIG. 2, the memory unit 23 stores vehicle control program 23A, torque map data 23B, decision threshold map data 23C, and gradient torque map data 23D, etc.

The CPU 21A is an example of a computer. The term computer here refers to a processor in the broadest sense and includes general-purpose processors (e.g., CPU), or specialized processors (e.g., GPU: Graphics Processing Unit, ASIC: Application Specific Integrated Circuit FPGA: Field Programmable Gate Array, programmable logic device, etc.).

Note that the vehicle control program 23A may be stored in the memory unit 23 by storing it on a non-volatile, non-transitory storage media or by distributing it over a network and installing it in the vehicle control device 10 as appropriate. In addition, the vehicle control program 23A may be updated as needed by so-called OTA (Over The Air).

Examples of non-volatile, non-transitory storage media include CD-ROM (Compact Disc Read Only Memory), magneto-optical disks, HDD (Hard Disk Drive), DVD-ROM (Digital Versatile Disc Read Only Memory), flash memory, memory cards, etc.

Figure 3:
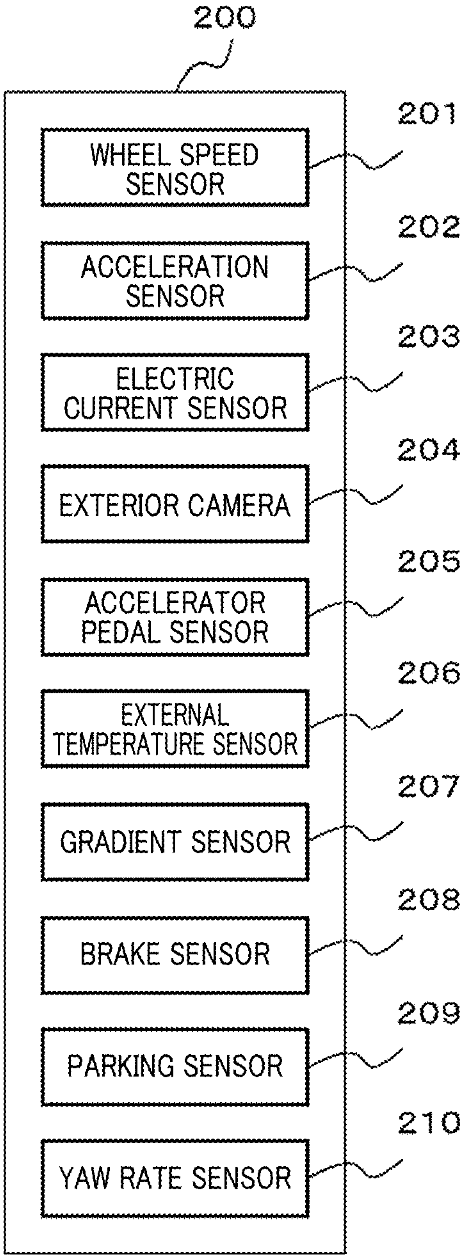
FIG. 3 shows a block diagram of a functional structure of the vehicle control device.

The vehicle 100 is equipped with several sensors for measuring various physical quantities. As shown in FIG. 3, the above-mentioned sensor group 200 includes a wheel speed sensor 201, an acceleration sensor 202, an electric current sensor 203, an exterior camera 204, an accelerator pedal sensor 205, an external temperature sensor 206, a gradient sensor 207, a brake sensor 208, a parking sensor 209, and a yaw rate sensor 210.

The wheel speed sensor 201 is a sensor for measuring the number of rotations per unit time of the wheel 111, etc. Although the wheel speed sensor 201 is provided individually for each of the four wheels 111, 112, 121, and 122, the wheel speed sensor 201 is schematically depicted as a single block in FIG. 3. A signal indicating the number of rotations measured by the wheel speed sensor 201 is transmitted to the vehicle control device 10. The vehicle control device 10 can ascertain the traveling speed of the vehicle 100 based on the signal.

An acceleration sensor 202 is a sensor for detecting the acceleration of vehicle 100. The acceleration sensor 202 is mounted on the vehicle body 101. The acceleration sensor 202 is configured as a 6-axis acceleration sensor capable of detecting the pitching, rolling, and yawing rotational accelerations of the vehicle body 101, in addition to the front-back, left-right, and longitudinal accelerations.

The acceleration acquired by the acceleration sensor 202 includes the acceleration GX along the direction of travel of the vehicle 100 (i.e., front-back direction) and the acceleration Gy along the left-right direction of the vehicle 100. The acceleration GX is also referred to as a longitudinal acceleration and the acceleration Gy is also referred to as a lateral acceleration. These are all acquired as numerical values with the unit of G being the acceleration of gravity, for example, 0.5 G. A signal indicating each acceleration detected by the acceleration sensor 202 is transmitted to the vehicle control device 10.

The electric current sensor 203 is a sensor for detecting the value of the drive electric current flowing through the rotating electrical machine 150. A signal indicating the value of the drive electric current detected by the electric current sensor 203 is input to the vehicle control device 10. The vehicle control device 10 can determine the magnitude of the torque produced by the rotating electrical machine 150 based on the value of the input driving electric current.

The exterior camera 204 is a camera that captures images of the surroundings of the vehicle 100, and is, for example, a CMOS camera. The data from the images captured by the exterior camera 204 is input to the vehicle control device 10. By processing the images, the vehicle control device 10 can determine the presence or absence of obstacles (e.g., steps such as wheel stops) and their shapes around the vehicle 100.

Note that in addition to or in place of the exterior camera 204, other sensors may be provided to detect the surroundings of the vehicle 100. Such sensors include, for example, LIDAR sensors and radar.

The accelerator pedal sensor 205 is a sensor that detects the amount of accelerator pedal operation, or accelerator pedal opening degree.

The external temperature sensor 206 is a sensor that detects the external temperature of the vehicle 100.

The gradient sensor 207 is a sensor that detects the gradient of the road surface on which the vehicle 100 travels.

The brake sensor 208 is a sensor that detects the brake hydraulic pressure of the brake devices 131 and 132.

The parking sensor 209 is a sensor that detects whether a parking brake of the vehicle 100 is on or off.

The yaw rate sensor 210 is a sensor that detects yaw rate.

Figure 4:
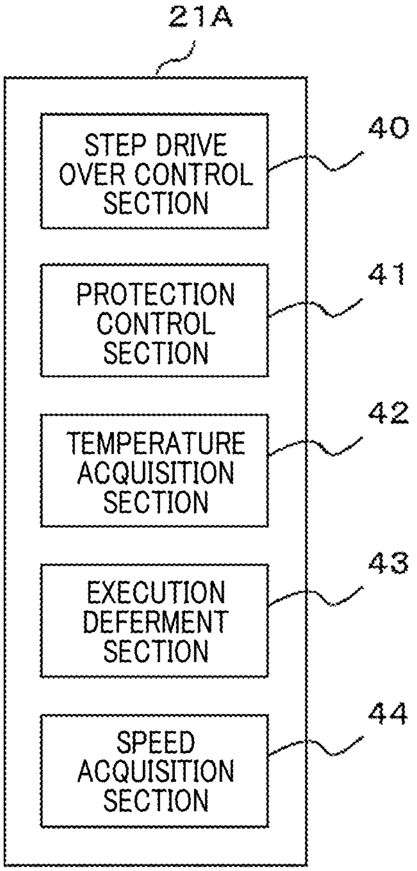
FIG. 4 shows a functional block diagram of a step drive over control section.

FIG. 4 is a block diagram showing the functional configuration of the CPU 21A of the vehicle control device 10. As shown in FIG. 4, the CPU 21A is functionally equipped with the following functional sections: a step drive over control section 40, a protection control section 41, a temperature acquisition section 42, an execution deferment section 43, and a speed acquisition section 44.

The step drive over control section 40 performs step drive over control for the vehicle 100 to drive over a step.

The protection control section 41 performs protective control to protect the rotating electrical machinery 150 that drives the vehicle 100 by suppressing overheating of the rotating electrical machinery 150.

The temperature acquisition section 42 acquires the temperature of the rotating electrical machine 150.

If the temperature of the rotating electric machine 150 rises above a first threshold value for which the protective control should be executed during the execution of the step drive over control of the vehicle 100, the execution deferment section 43 defers the execution of the protective control until a predetermined time elapses.

The speed acquisition section 44 acquires the speed of the vehicle 100.

The protection control section 41 may set a protection control torque to be applied to the rotating electric machine 150 so that the speed of the vehicle 100 becomes the target vehicle speed if the temperature of the rotating electric machine 150 exceeds the first threshold value.

In addition, the protection control section 41 may set the protection control torque so that the speed of the vehicle is below a predetermined speed when the temperature of the rotating electric machine 150 is greater than a second threshold value, which is greater than the first threshold value.

In addition, if the rotating electric machine 150 is a three-phase motor generator, the temperature acquisition section 42 may estimate the temperature based on the electric current value of the current flowing in the motor generator. Specifically, the temperature acquisition section 42 may estimate the temperature if the vehicle 100 is below the predetermined speed and a single phase of the motor generator is continuously energized, so that the rate of temperature increase is higher than the temperature estimated when the motor generator is above the predetermined speed.

In addition, if the speed of the vehicle 100 is lower than a first speed and a step is higher than a first predetermined height, the step drive over control section 40 executes a drive over prohibition control, which prohibits the vehicle 100 from overriding the step. Further, if the speed of the vehicle 100 is faster than a second speed, which is faster than the first speed, or if the height of the step is lower than a second predetermined height, which is lower than the first predetermined height, the step drive over control section 40 executes the step drive over control at the request of the driver of the vehicle 100. Furthermore, if the speed of the vehicle 100 is less than the second speed and the height of the step is higher than the second predetermined height and less than the first predetermined height, and if the speed of the vehicle 100 is faster than the first speed and less than the second speed and the height of the step is higher than the first predetermined height, the step drive over control section 40 may perform low-speed drive over control to drive over a step at the first speed.

The CPU 21A functions as each functional section shown in FIG. 4 by reading and executing the vehicle control program 23A stored in the memory unit 23. It should be noted that the vehicle control program 23A includes a protection control process in FIG. 5, a step drive over control process in FIG. 6, and a torque selection process in FIG. 7, as described later.

Figure 5:
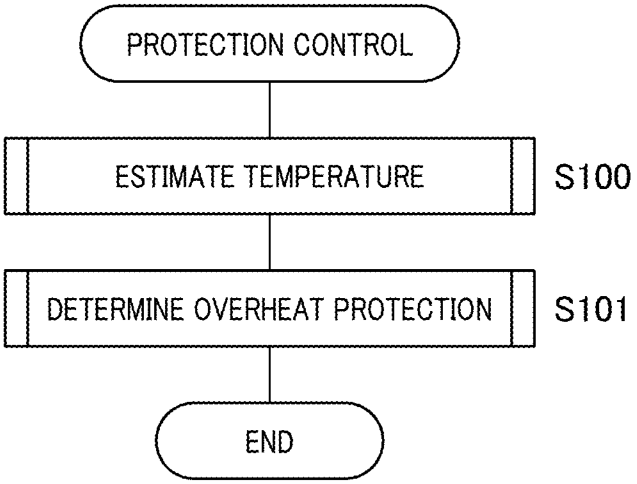
FIG. 5 shows a flowchart of a protection control.

Next, with reference to FIG. 5, the protection control process executed by the CPU 21A of control unit 21, i.e., the protection control process to protect the rotating electric machine 150 by suppressing overheating of the rotating electric machine 150 that drives the vehicle 100, is described. The protection control process shown in FIG. 5 is a process that is repeated every predetermined time, e.g., every 10 msec.

Figure 8:
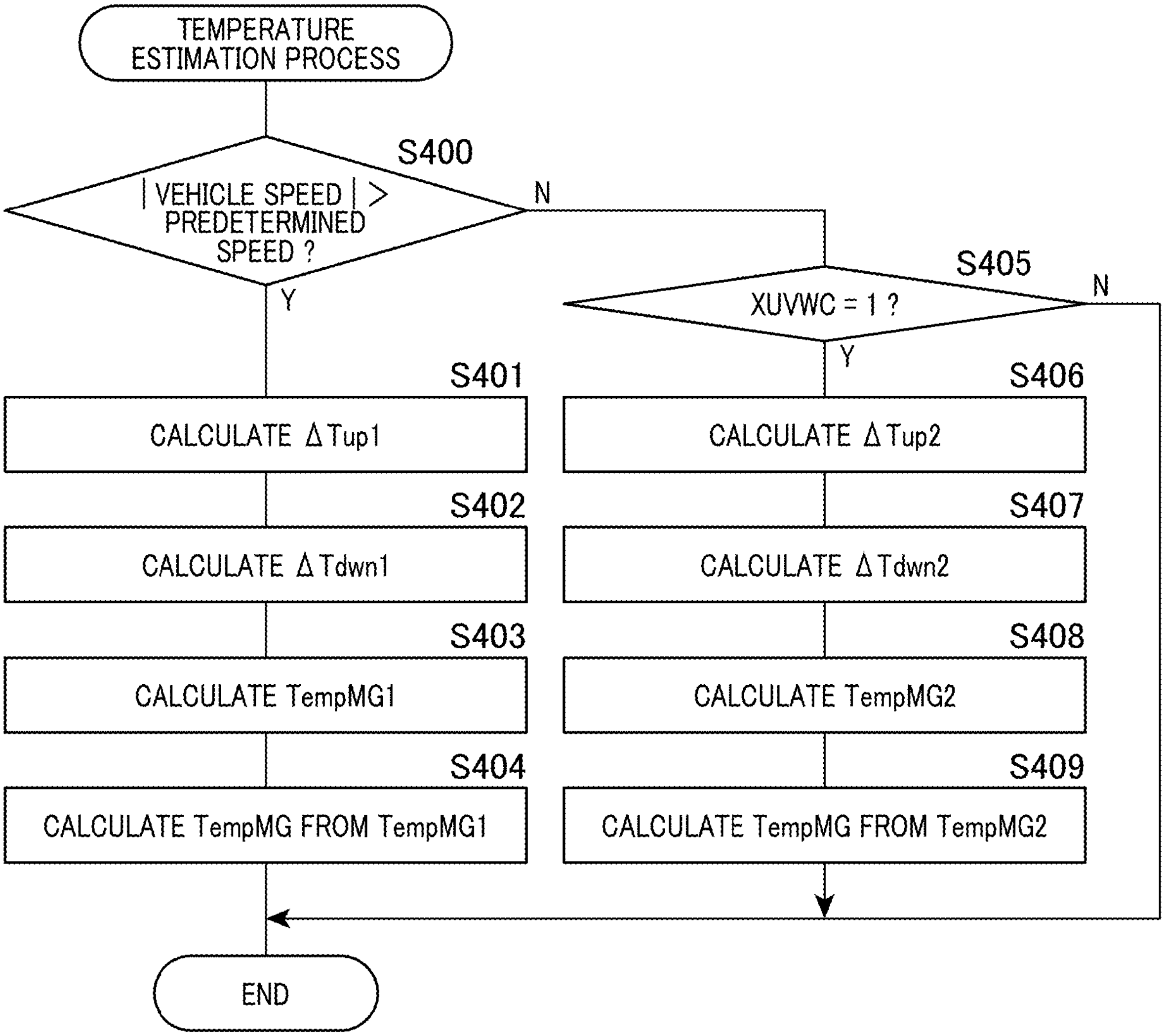
FIG. 8 shows a flowchart of a temperature estimation process.

In step S100, the CPU 21A executes a temperature estimation process shown in FIG. 8. The details of the temperature estimation process are described later.

Figure 10:
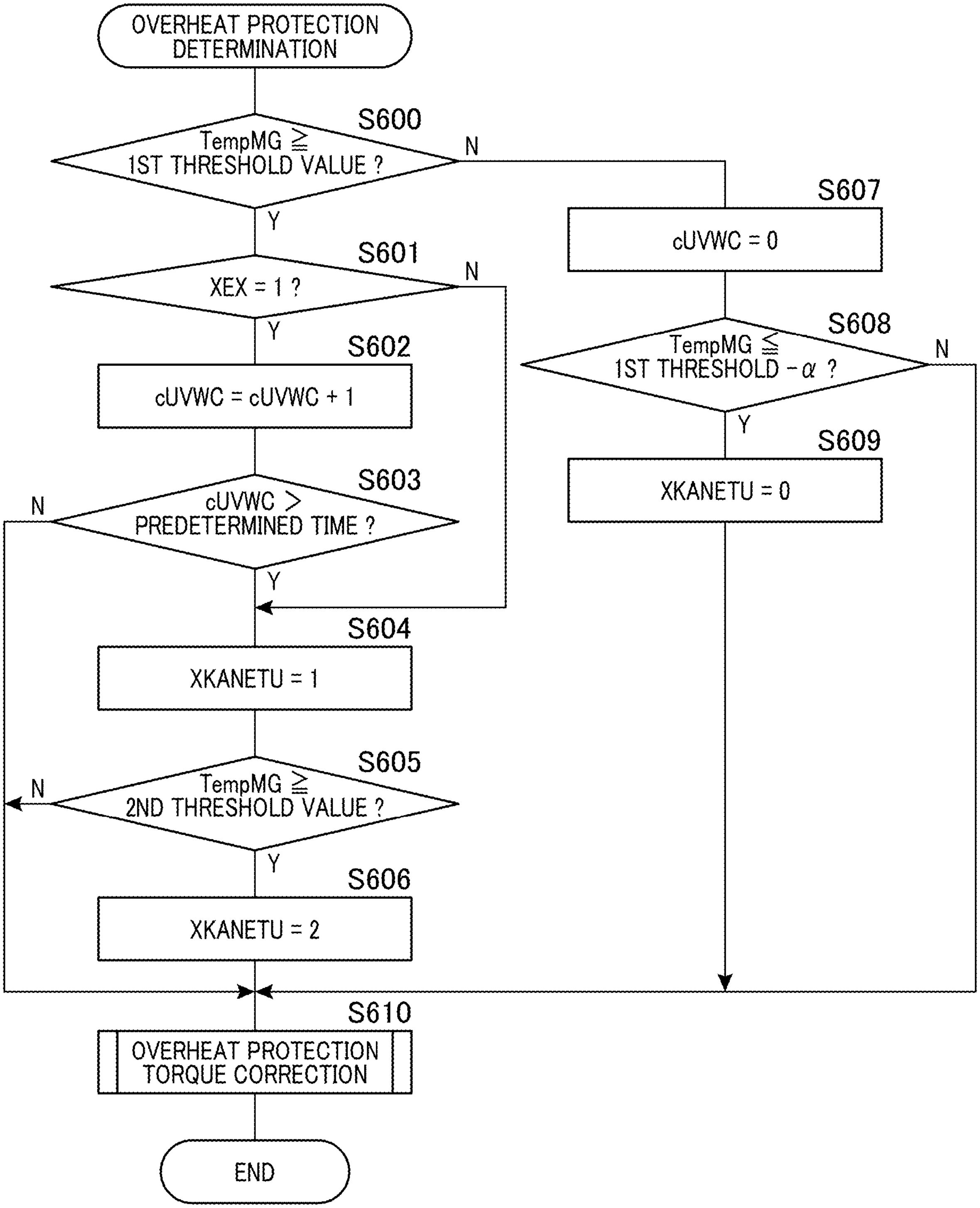
FIG. 10 shows a flowchart of an overheat protection determination process.

In step S101, the CPU 21A executes an overheat protection determination process shown in FIG. 10. In the overheat protection determination process, the protection control torque TH to be applied to the rotating electrical machine 150 is calculated and stored in the memory unit 23. The protection control torque TH stored in memory unit 23 is sequentially updated each time the protection control process is executed. Note that the details of the overheat protection determination process are described later.

Figure 6:
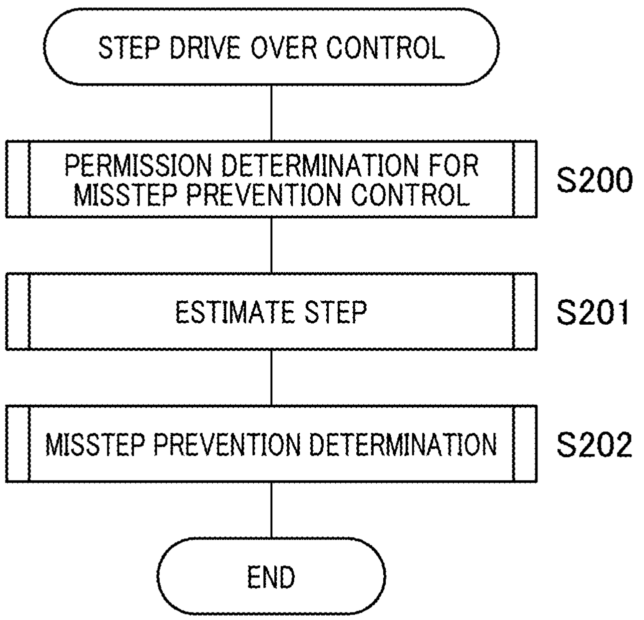
FIG. 6 shows a flowchart of a step drive over control.

Next, the step drive over control process executed by the CPU 21A of the control unit 21 is described with reference to FIG. 6. The step drive over control process shown in FIG. 6 is a process that is repeatedly executed every predetermined time, e.g., every 10 msec.

Figure 12:
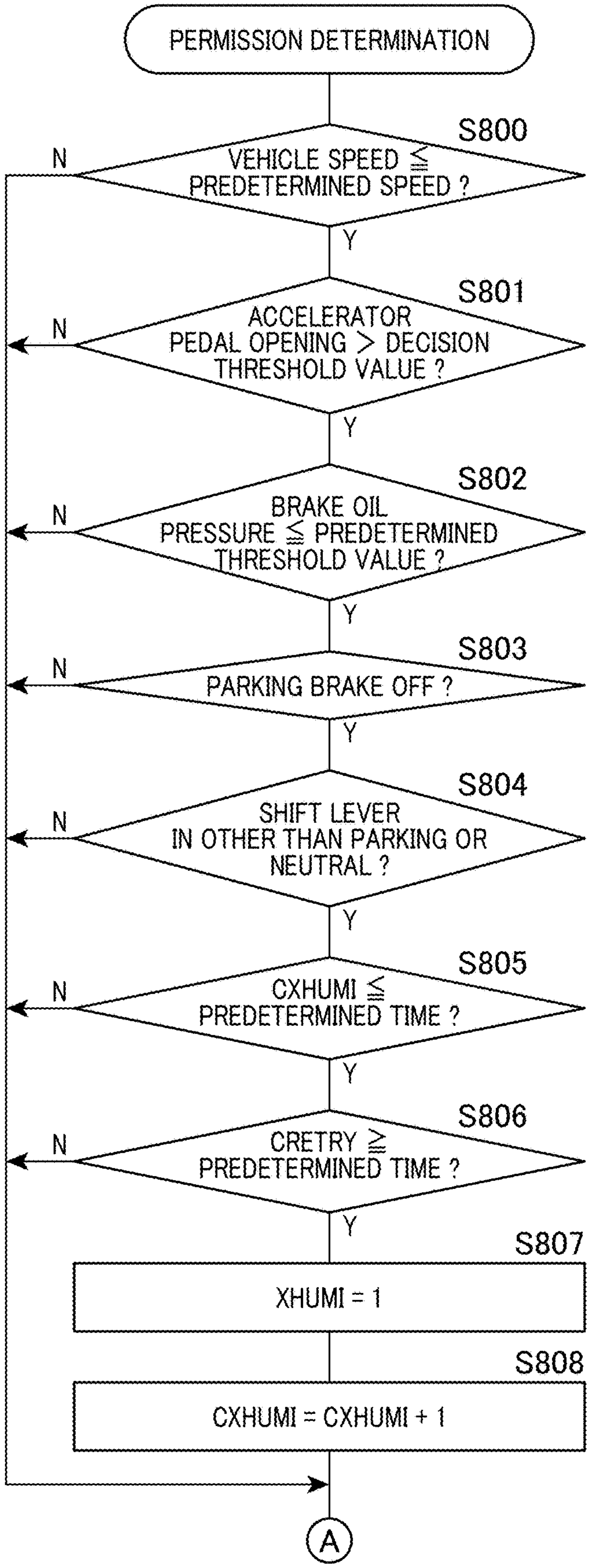
FIG. 12 shows a flowchart of a permission determination process for the step drive over control.
Figure 13:
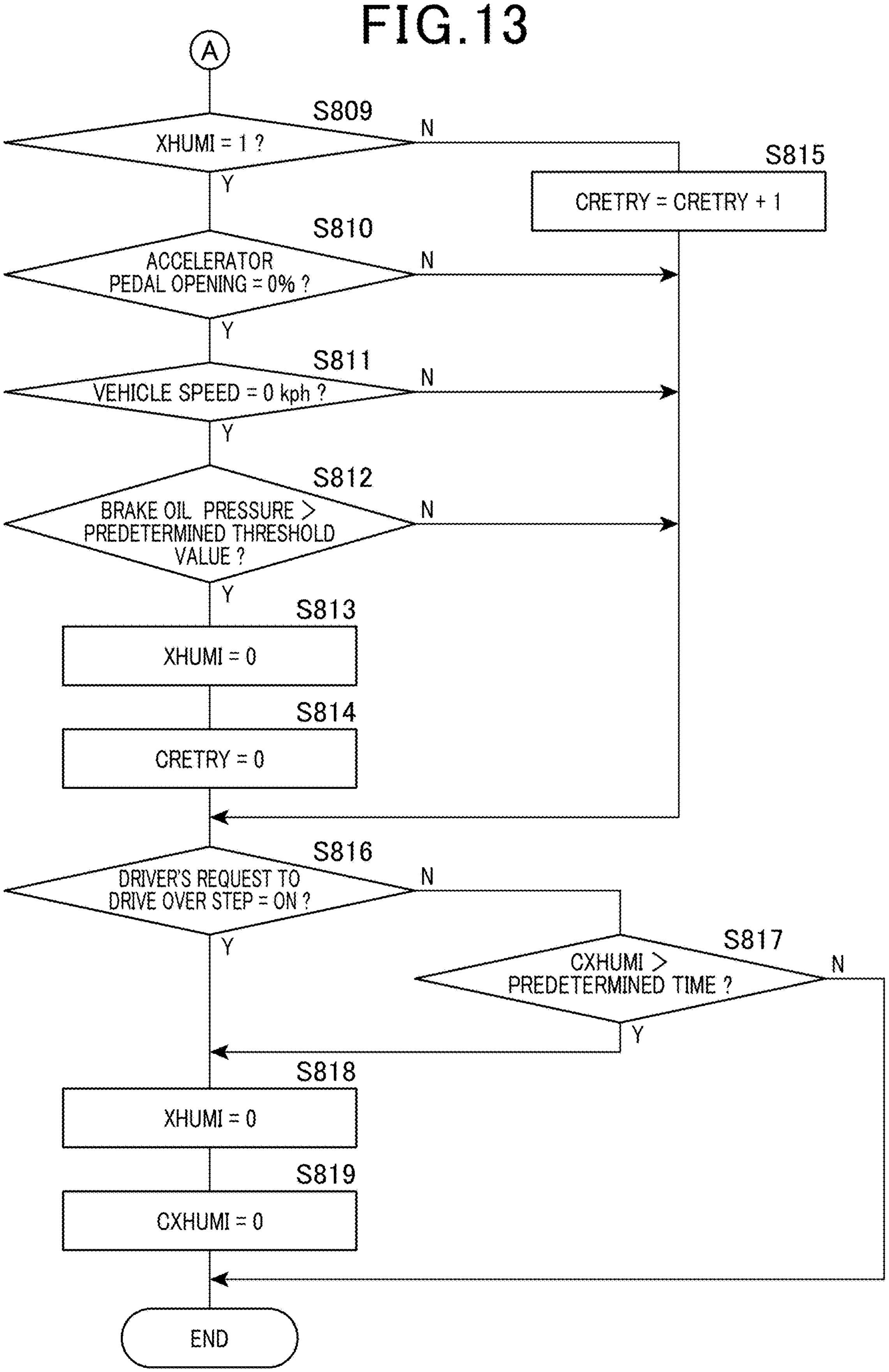
FIG. 13 shows a flowchart of the permission determination process the step drive over control.

In step S200, the CPU 21A executes a permission determination process for a misstep prevention control shown in FIGS. 12 and 13. Note that the details of the permission determination process for the misstep prevention control are described later.

Figure 15:
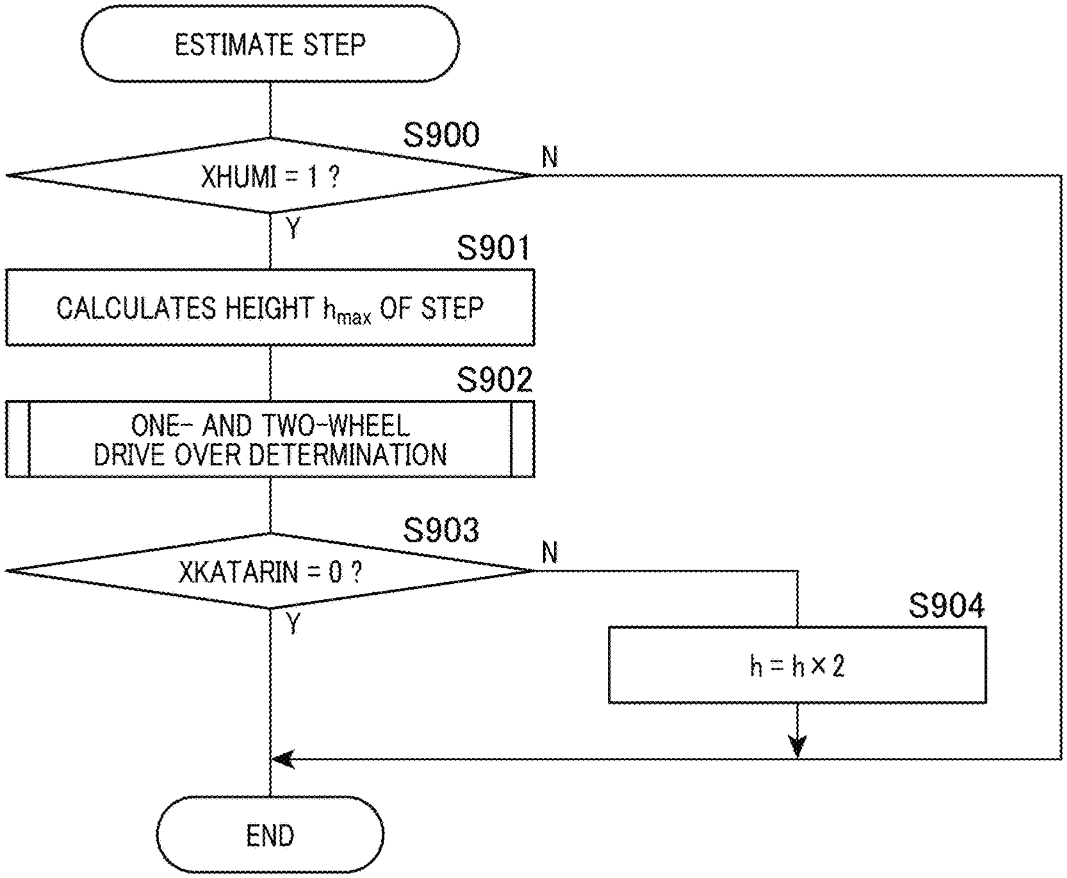
FIG. 15 shows a flowchart of a step estimation process.

In step S201, the CPU 21A executes a step estimation process shown in FIG. 15. Note that the details of the step estimation process are described later.

Figure 19:
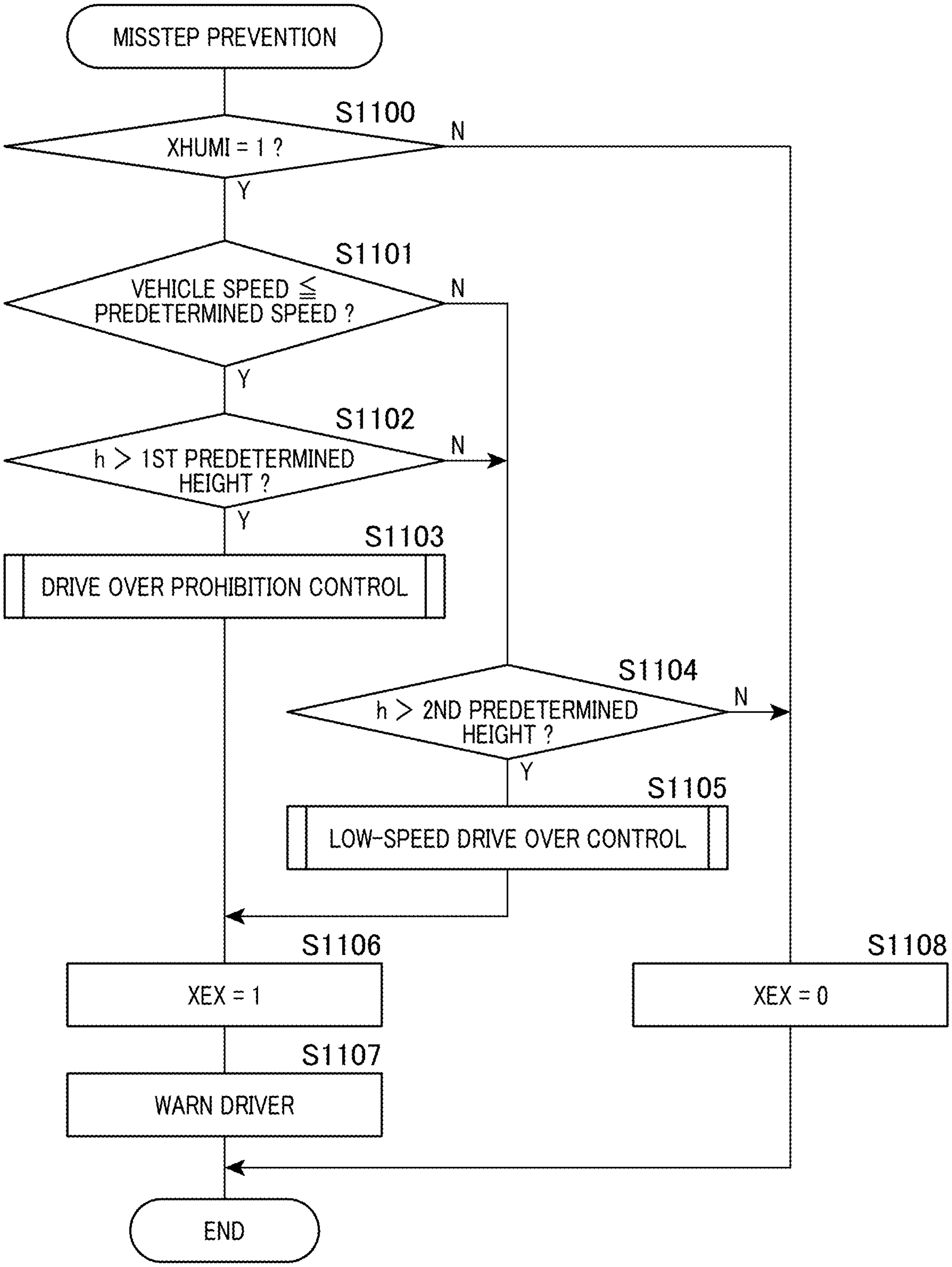
FIG. 19 shows a flowchart of a misstep prevention process.

In step S202, the CPU 21A executes a misstep (means to step on the wrong pedal) determination process shown in FIG. 19. In the misstep determination process, a misstep prevention control torque TO to be applied to the rotating electric machine 150 is calculated and stored in the memory unit 23. The misstep prevention control torque TO stored in the memory unit 23 is sequentially updated each time the step drive over control is executed. Note that the details of the misstep determination process are described later.

Figure 7:
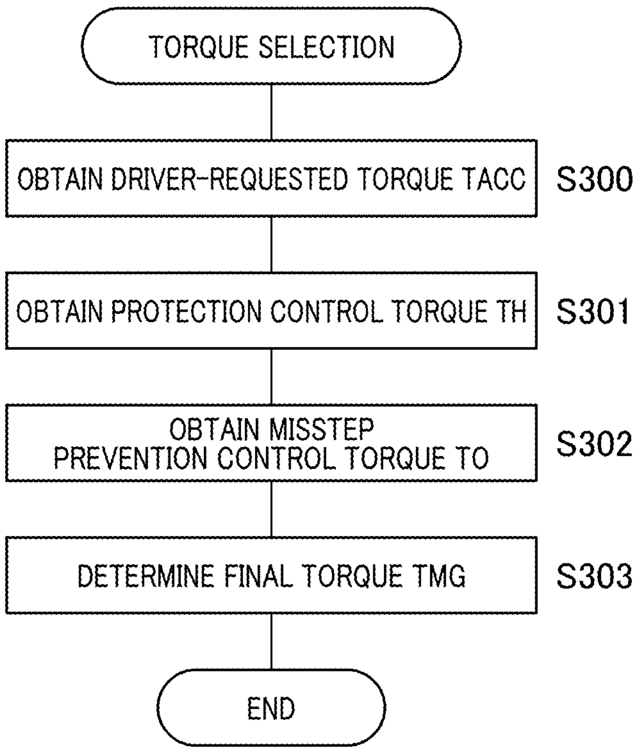
FIG. 7 shows a flowchart of a torque selection process.

Next, the torque selection process executed by the CPU 21A of the control unit 21 is explained with reference to FIG. 7. The torque selection process shown in FIG. 7 is a process that is repeated every predetermined time, e.g., every 10 msec.

In step S300, the CPU 21A acquires a driver-required torque TACC according to the amount of accelerator pedal operation by the driver of vehicle 100 by reading it from the memory unit 23. The driver-required torque TACC is a torque value corresponding to the amount of accelerator operation by the driver of the vehicle 100. For example, the torque map data 23B, which shows the correspondence relationship between the amount of accelerator pedal operation and the torque value, is stored in the memory unit 23 in advance, and this is stored in memory unit 23 as the driver-requested torque TACC. The driver-required torque TACC stored in the memory unit 23 is sequentially updated in accordance with the accelerator pedal operation amount of the driver.

In step S301, the CPU 21A obtains the protection control torque TH calculated by the protection control process shown in FIG. 5 by reading it from the memory unit 23.

In step S302, the CPU 21A acquires the misstep prevention control torque TO calculated by the step drive over control process shown in FIG. 6 by reading it from the memory unit 23.

In step S303, the CPU 21A determines a final torque TMG to be applied to the rotating electric machine 150. Specifically, the final torque TMG is determined as the torque with the lowest torque value among the driver-required torque TACC obtained in step S300, the protection control torque TH obtained in step S301, and the misstep prevention control torque TO obtained in step S302. This prevents excessive torque from being applied to the rotating electric machine 150.

Next, the details of the temperature estimation process in step S100 of FIG. 8 are explained with reference to FIG. 10.

In step S400, the CPU 21A calculates the traveling speed of the vehicle (hereinafter referred to as a vehicle speed) based on the wheel speed acquired from the wheel speed sensor 201, and determines whether the calculated absolute value of the vehicle speed (hereinafter referred to simply as a vehicle speed) is greater than the predetermined speed. Here, the predetermined speed is a speed at which the vehicle 100 can be considered stopped, which in the present embodiment is 0.1 kph as an example, but it is not limited to this.

Then, if the vehicle speed is greater than the predetermined speed, i.e., the vehicle 100 is moving, the process proceeds to step 401, and if the vehicle speed is less than the predetermined speed, i.e., the vehicle 100 is stopped, the process proceeds to step S405.

In step S401, the CPU 21A calculates ΔTup1, which indicates the temperature increase due to heat generated by the rotating electric machine 150. ΔTup1 can be calculated by the following equation.

$$\Delta Tup1 = k1 \times |iMG| \quad (1)$$

Here, iMG is an electric current value of the electric current flowing through the rotating electric machine 150, which can be obtained from the electric current sensor 203. In addition, k1 is a predetermined coefficient for converting the electric current value iMG to temperature, and is preset as a value suitable for calculating ΔTup when the absolute value of vehicle speed is greater than a predetermined speed. In this way, ΔTup1 is the absolute value of the electric current value iMG multiplied by the coefficient k1.

In step S402, ΔTdwn1 is calculated, which indicates the temperature drop due to heat dissipation of the rotating electric machine 150 by heat exchange with the outside. ΔTdwn1 can be calculated, for example, by a predetermined calculation equation that includes the external temperature of the vehicle 100 as a parameter. The external temperature can be obtained from the external temperature sensor 206.

In step S403, the CPU 21A calculates the temperature TempMG1 of the rotating electric machine 150 using the following equation.

$$TempMG1 = TempMG1 + (\Delta Tup - \Delta Tdwn) \quad (2)$$

In this way, TempMG1 is updated by adding the difference between the temperature increase ΔTup and the temperature decrease ΔTdwn to the current TempMG1.

In step S404, the CPU 21A calculates an estimated temperature TempMG of the rotating electric machine 150 based on the temperature TempMG1 calculated in step S403 using the following equation.

$$TempMG = LPF1(TempMG1) \quad (3)$$

Here, LPF1 ( ) is a function indicating a low-pass filter.

In step S405, the CPU 21A determines whether a single-phase continuous energization flag XUVWC is 1. The details of the single-phase continuous energization flag XUVWC are described later, but if the single-phase continuous energization flag XUVWC is 1, it indicates that continuous energization is in progress in any of the U, V, and W phases of the rotating electric machine 150, which is a three-phase motor generator, i.e., indicating that the phase is not changing and the rotating electric machine 150 is stopped. On the other hand, if the single-phase continuous energization flag XUVWC is 0, it indicates that the energized phase is changing from any of phases U, V, or W to the other phase, i.e., indicating that the rotating electrical machine 150 is rotating. Then, if the single-phase continuous energization flag XUVWC is 1, i.e., the rotating electric machine 150 is stopped, the process proceeds to step 406, and if the single-phase continuous energization flag XUVWC is 0, i.e., the rotating electric machine 150 is rotating, the present process ends.

In step S406, the CPU 21A calculates ΔTup2, which indicates the temperature increase due to heat generated by the rotating electrical machine 150. ΔTup2 can be calculated by the following equation.

$$\Delta Tup2 = k2 \times |iMG| \tag{4}$$

Here, k2 is a predetermined coefficient for converting the electric current value iMG to temperature, and is preset as a coefficient suitable for calculating ΔTup when the absolute value of vehicle speed is below a predetermined speed and the single-phase continuous energization flag XUVWC is 1. In this way, ΔTup2 is the absolute value of the electric current value iMG multiplied by the coefficient k2.

In step S407, ΔTdwn2 is calculated, which indicates the temperature drop due to heat dissipation of the rotating electric machine 150 by heat exchange with the outside. ΔTdwn2 can be calculated in the same way as in step S402, for example, by a predetermined calculation equation that includes the external temperature of the vehicle 100 as a parameter.

In step S408, the CPU 21A calculates the temperature TempMG2 of the rotating electric machine 150 using the following equation.

$$TempMG2 = TempMG2 + (\Delta Tup - \Delta Tdwn) \tag{5}$$

In this way, TempMG2 is updated by adding the difference between the temperature increase ΔTup and the temperature decrease ΔTdwn to the current TempMG2.

In step S409, the CPU 21A calculates the estimated temperature TempMG of the rotating electric machine 150 based on the temperature TempMG2 calculated in step S408 using the following equation.

$$TempMG = LPF2(TempMG2) \tag{6}$$

Here, LPF2 ( ) is a function indicating a low-pass filter. Here, the time constant of function LPF2 ( ) is smaller than that of function LPF1 ( ). That is, if the vehicle speed is below a predetermined speed and the single phase of the rotating electric machine 150 is continuously energized, the temperature is estimated so that the rate of temperature increase is higher than that estimated when the vehicle speed is greater than the predetermined speed.

Note that if a temperature sensor is provided to detect the temperature of the rotating electrical machine 150, the temperature obtained from the temperature sensor may be used as TempMG instead of the temperature estimation process in FIG. 10.

Next, the single-phase continuous energization determination process is explained with reference to FIG. 9.

In step S500, the CPU 21A determines whether the energized phase has changed. n other words, the CPU 21A determines whether any of the energized phases (U-, V-, or W-phase) has changed to the other phase. Then, if the energized phase has not changed, the process proceeds to step S501, and if the energized phase has changed, the process proceeds to step S504.

In step S501, the CPU 21A updates a counter $T_{ent}$, which indicates a single-phase continuous energization time, using the following equation.

$$T_{ent} = T_{ent} + (t_n - t_{n-1}) \tag{7}$$

Figure 9:
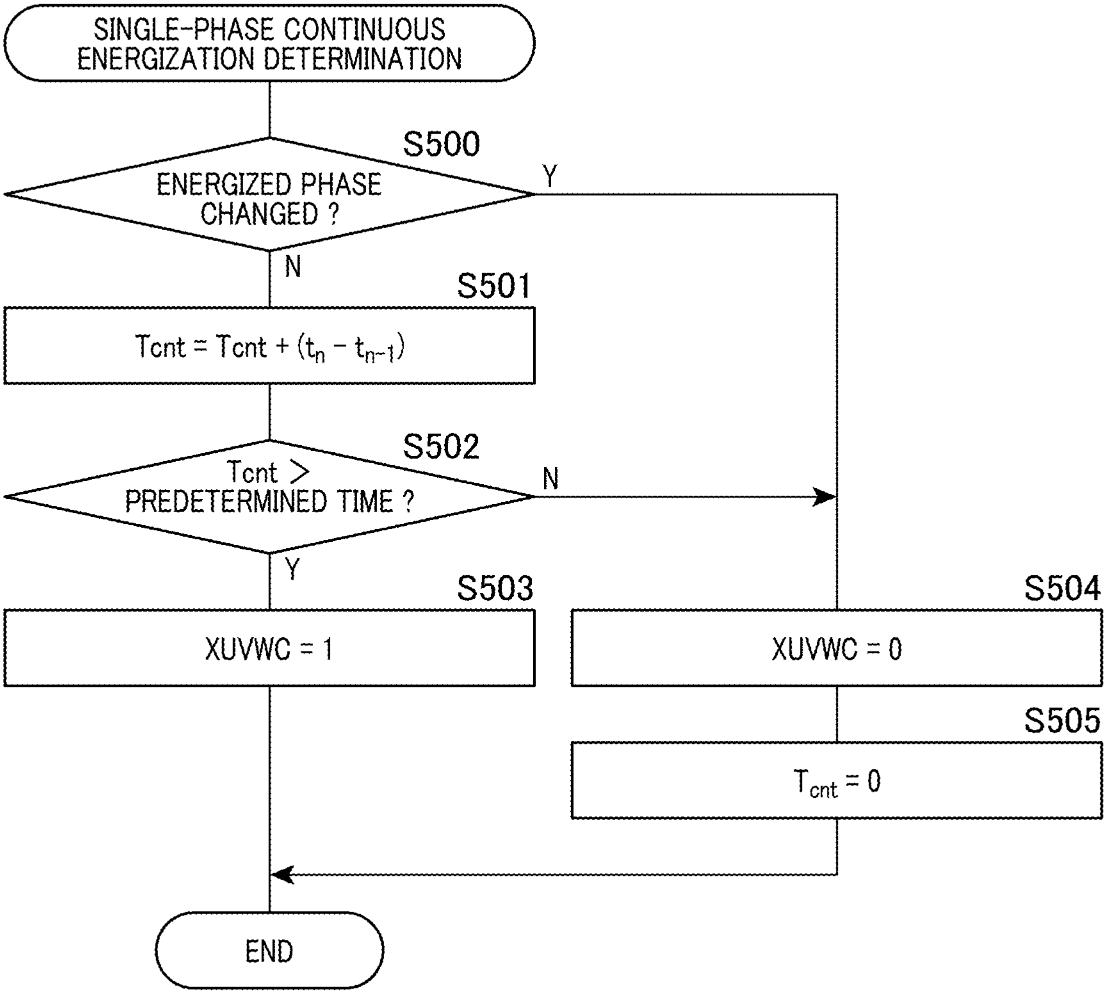
FIG. 9 shows a flowchart of a single-phase continuous energization determination process.

Here, $t_n$ is the time when the process in FIG. 9 is executed at the present time, and $t_{n-1}$ is the time when the process in FIG. 9 was executed previously. Note that the counter $T_{ent}$ is reset in step S505 described later.

In step S502, the CPU 21A determines whether the counter $t_{ent}$ is greater than the predetermined time, i.e., whether the predetermined time has elapsed since the counter $t_{ent}$ was reset. The predetermined time is set to 0.5 seconds as an example in the present embodiment, but it is not limited to this. Then, if the counter $t_{ent}$ is greater than the predetermined time, the process proceeds to step S503, and if the counter $t_{ent}$ is less than the predetermined time, the process proceeds to step S504.

In step S503, the CPU 21A sets the single-phase continuous energization flag XUVWC to 1.

In step S504, the CPU 21A sets the single-phase continuous energization flag XUVWC to 0.

In step S505, the CPU 21A sets the counter $T_{ent}$ to 0. In other words, the counter $T_{ent}$ is reset.

Next, the details of an overheat protection process in step S101 of FIG. 5 are explained with reference to FIG. 10.

In step S600, the CPU 21A determines whether the temperature TempMG estimated in the temperature estimation process in FIG. 8 is greater than or equal to a first threshold value. The first threshold value is the temperature at which overheat protection control should normally be performed, and is set at 165° C. as an example in the present embodiment, but it is not limited to this. Then, if TempMG is greater than or equal to the first threshold value, the process proceeds to step S601, and if TempMG is less than the first threshold value, the process proceeds to step S607.

In step S601, the CPU 21A determines whether a step drive over control flag XEX is 1. If the step drive over control flag XEX is 1, it indicates that the step drive over control described later is being executed, and if the step correction flag XEX is 0, it indicates that the step drive over control is not being executed. The setting of the step drive over control flag is described later.

Then, if the step drive over control flag XEX is 1, i.e., if the step drive over control is being executed, the process proceeds to step S602. On the other hand, if the step drive over control flag XEX is 0, i.e., if the step drive over control is not being executed, the process proceeds to step S604.

In step S602, the CPU 21A increments cUVWC, an execution deferment counter for overheat protection control, by the following equation.

$$cUVWC = cUVWC + 1 \tag{8}$$

In step S603, the CPU 21A determines whether the execution deferment counter cUVWC has exceeded the predetermined time. The predetermined time is set to 1 second as an example in the present embodiment, but it is not limited to this. Then, if the execution deferment counter cUVWC exceeds the predetermined time, the process proceeds to step S604, and if the execution deferment counter cUVWC is less than the predetermined time, the process proceeds to step S610.

In step S604, the CPU 21A sets XKANETU to 1, indicating an overheat protection mode.

In step S605, the CPU 21A determines whether the temperature TempMG estimated in the temperature estimation process in FIG. 8 is above a second threshold value. The second threshold value is set to a value greater than the first threshold, and in the present embodiment is set to 180° C. as an example, but it is not limited to this. Then, if TempMG is greater than or equal to the second threshold, the process proceeds to step S606, and if TempMG is less than the second threshold, the process proceeds to step S610.

In step S606, the CPU 21A sets the overheat protection mode XKANETU to 2.

In step S607, the CPU 21A sets the execution deferment counter cUVWC to 0. In other words, the execution deferment counter cUVWC is reset.

In step S608, the CPU 21A determines whether TempMG is less than or equal to (first threshold $-\alpha$). Here, $\alpha$ is a coefficient to provide hysteresis when resetting XKANETU, which indicates the overheat protection mode. In the present embodiment, as an example, $\alpha$ is set at 25° C., but it is not limited to this. Then, if TempMG is less than or equal to (first threshold $-\alpha$), the process proceeds to step S609, and if TempMG is greater than (first threshold $-\alpha$), the process proceeds to step S610.

In step S609, the CPU 21A sets the overheat protection mode XKANETU to 0.

Figure 11:
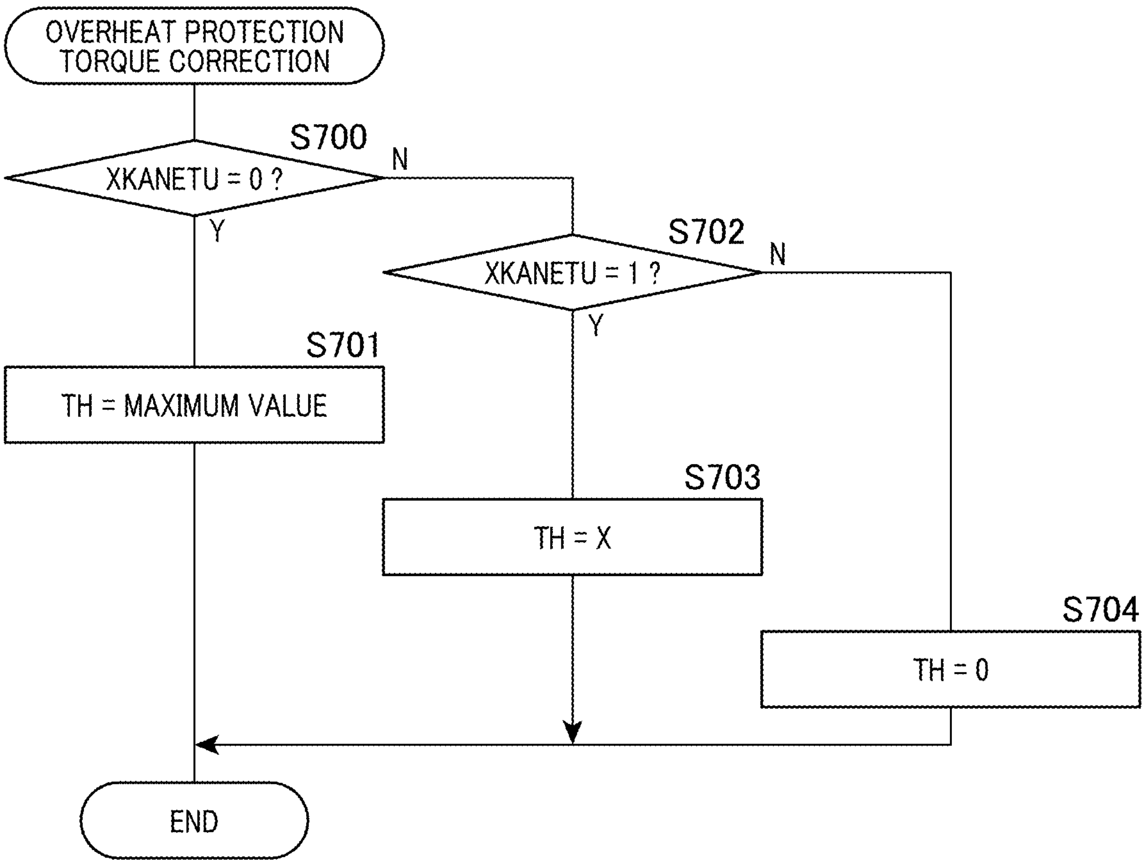
FIG. 11 shows a flowchart of an overheat protection torque correction process.

In step S610, the CPU 21A executes an overheat protection torque correction process shown in FIG. 11.

As shown in FIG. 11, in step S700, the CPU 21A determines whether the overheat protection mode XKANETU is 0. Then, if the overheat protection mode XKANETU is 0, the process proceeds to step S701, and if the overheat protection mode XKANETU is not 0, the process proceeds to step S702.

In step S701, CPU 21A sets an overheat protection control torque TH to the maximum possible value. In other words, the overheat protection control torque TH is set to a value at which the overheat protection control torque TH is not selected by the torque selection process in FIG. 7.

In step S702, the CPU 21A determines whether the overheat protection mode XKANETU is 1. Then, if the overheat protection mode XKANETU is 1, the process proceeds to step S703, and if the overheat protection mode XKANETU is not 1, i.e., if the overheat protection mode XKANETU is 2, the process proceeds to step S704.

In step S703, the CPU 21A sets the overheat protection control torque TH to X. Here, X is a torque at which the vehicle speed is the target vehicle speed, and is set to a value such that the vehicle speed is 0.5 kph to 1 kph as an example in the present embodiment.

In step S704, the CPU 21A sets the overheat protection control torque TH to 0. In other words, the overheat protection control torque TH is set to a value at which the rotating electrical machine 150 stops.

Next, the details of the permission determination process for the misstep prevention control in step S200 in FIG. 6 are explained with reference to FIGS. 12 and 13. It should be noted that FIG. 12 is the permission determination process to determine whether to permit the misstep prevention control, and FIG. 13 is a prohibition determination process to determine whether to prohibit the misstep prevention control.

In step S800, the CPU 21A determines whether the vehicle speed is below a predetermined speed. The predetermined speed is set at a relatively low speed, and in the present embodiment, the predetermined speed is set at 9 kph as an example, but it is not limited to this. Then, if the vehicle speed is below the predetermined speed, the process proceeds to step S801, and if the vehicle speed is faster than the predetermined speed, the process proceeds to step S809 in FIG. 15.

Figure 14:
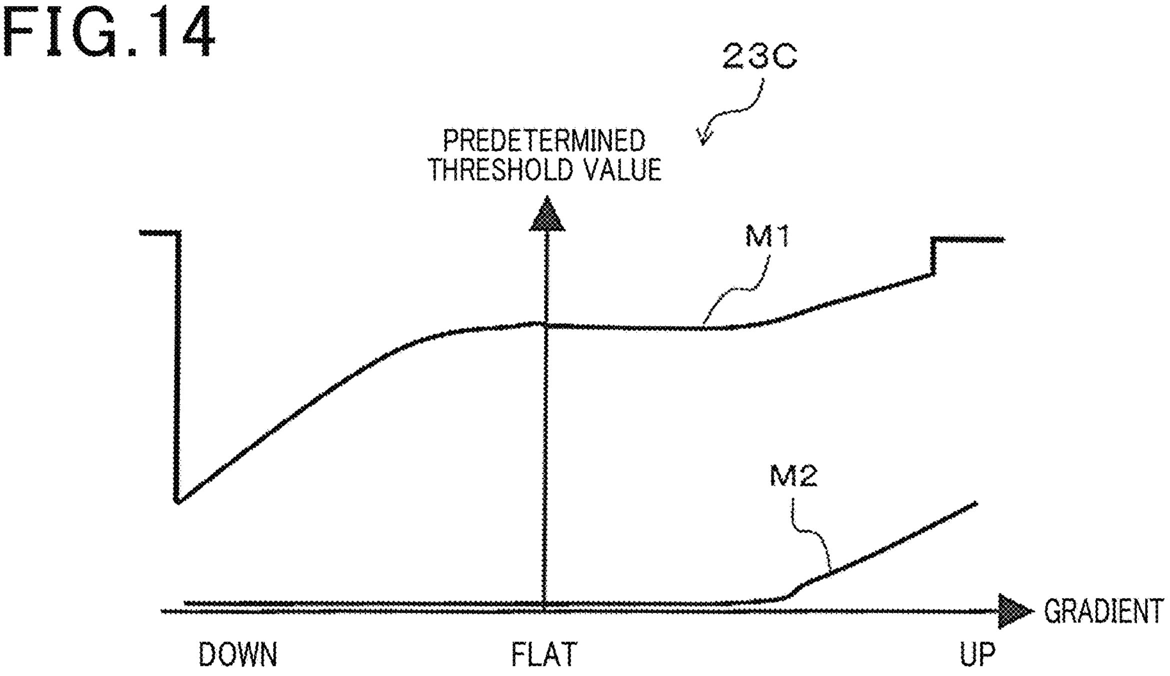
FIG. 14 shows a diagram for explaining decision threshold map data.

In step S801, the CPU 21A determines whether the accelerator pedal opening degree is greater than the decision threshold value. The predetermined threshold value is determined based on the decision threshold map data 23C. FIG. 14 shows an example of the decision threshold map data 23C. As shown in FIG. 14, the decision threshold map data 23C has a map M1 for the permission determination processing and a map M2 for prohibition decision. A horizontal axis in FIG. 14 is the gradient of the road surface and a vertical axis is the decision threshold, and the decision threshold changes according to the gradient of the road surface. As shown in FIG. 14, in the M1 map for the permit decision process, the decision threshold is set to the maximum value in areas where the downhill gradient is too large and the uphill gradient is too large. In addition, among the regions other than the regions where the downhill gradient is too large and the uphill gradient is too large, the decision threshold gradually increases in the regions where the gradient is downhill to flat, and the decision threshold is almost constant in the regions where the gradient is flat. Further, in the region where the gradient is flat to uphill, the decision threshold becomes gradually larger. In the map M2 for the prohibition determination process, the decision threshold is almost 0 in the region where the gradient is from downhill to some degree of uphill, and the decision threshold gradually increases in the region from that area to further uphill.

In this way, the decision threshold is set according to the gradient of the road surface. Therefore, in step S801, the CPU 21A first acquires the accelerator pedal opening degree and the gradient of the road surface. The accelerator pedal opening degree can be obtained from the accelerator pedal sensor 205. In addition, the gradient of the road surface can be obtained from the gradient sensor 207. Next, the CPU 21A obtains the decision threshold value according to the acquired road surface gradient from the map M1 for the permission determination process. It then determines whether the accelerator pedal opening degree rate is greater than the decision threshold value. Then, if the accelerator pedal opening degree is greater than the decision threshold value, the process proceeds to step S802, and if the accelerator pedal opening degree is less than the decision threshold value, the process proceeds to step S809 in FIG. 13.

In step S802, the CPU 21A determines whether the brake oil pressure is below a predetermined threshold value. The brake oil pressure can be obtained from the brake sensor 208. The predetermined threshold value is set to a value that allows the system to determine that the brakes of the vehicle 100 are off if the brake oil pressure is below the predetermined threshold value. Then, if the brake oil pressure is below the predetermined threshold value, i.e., the brakes of the vehicle 100 are off, the process proceeds to step S803. In addition, if the brake oil pressure is greater than the predetermined threshold, i.e., the brakes of the vehicle 100 are on, the process proceeds to step S809 in FIG. 13.

In step S803, the CPU 21A determines whether the parking brake of the vehicle 100 is off. Whether the parking brake is off can be obtained from the parking sensor 209.

Then, if the parking brake is off, the process proceeds to step S804, and if the parking brake is on, the process proceeds to step S809 in FIG. 13.

In step S804, the CPU 21A determines whether a gear shift lever of the vehicle 100 is in a mode other than parking or neutral. In other words, it is determined whether the gear shift lever is in a mode in which the vehicle 100 can be driven, such as drive or reverse. Then, if the gear shift lever of the vehicle 100 is in a mode other than parking or neutral, the process proceeds to step S805, and if the gear shift lever of the vehicle 100 is not in a mode other than parking or neutral, the process proceeds to step S809 in FIG. 13.

In step S805, the CPU 21A determines whether CXHUMI, a counter for the time to permit the misstep prevention control, is less than or equal to a predetermined time. In the present embodiment, the predetermined time is set to 1 second as an example, but it is not limited to this. Then, if the counter CXHUMI is less than the predetermined time, the process proceeds to step S806, and if the counter CXHUMI exceeds the predetermined time, the process proceeds to step S809 in FIG. 13.

In step S806, the CPU 21A determines whether CRETRY, a counter for counting the time that has elapsed since the last time the misstep prevention control was prohibited, is greater than or equal to a predetermined time. In the present embodiment, the predetermined time is set to 30 seconds as an example, but it is not limited to this. Then, if the counter CRETRY is greater than the predetermined time, the process proceeds to step S807, and if the counter CXHUMI is less than the predetermined time, the process proceeds to step S809 in FIG. 13.

In step S807, XHUMI, a flag indicating whether to permit the execution of the misstep prevention control, is set to 1. When XHUMI is 1, it indicates that the execution of the misstep prevention control is permitted. On the other hand, when XHUMI is 0, it indicates that the execution of the misstep prevention control is prohibited.

In step S808, the CPU 21A increments the counter CXHUMI by the following equation.

$$CXHUMI = CXHUMI + 1 \tag{9}$$

In step S809 of FIG. 13, the CPU 21A determines whether the flag XHUMI is 1. In other words, it determines whether the execution of the misstep prevention control is permitted. The, if the flag XHUMI is 1, i.e., if the execution of the misstep prevention control is permitted, the process proceeds to step S810. On the other hand, if the flag XHUMI is 0, i.e., the execution of the misstep prevention control is prohibited, the process proceeds to step S815.

In step S810, the CPU 21A determines whether the accelerator pedal opening degree is 0%. Then, if the accelerator pedal opening degree is 0%, the process proceeds to step S811, and if the accelerator pedal opening degree is not 0%, the process proceeds to step S816.

In step S811, the CPU 21A determines whether the vehicle speed is 0 kph. Then, if the vehicle speed is 0 kph, the process proceeds to step S812, and if the vehicle speed is not 0 kph, the process proceeds to step S816.

In step S812, CPU 21A determines whether the brake oil pressure is greater than a predetermined threshold value. Then, if the brake oil pressure is greater than the predetermined threshold value, i.e., the brake is on, the process proceeds to step S813, and if the brake oil pressure is less than the predetermined threshold value, i.e., the brake is off, the process proceeds to step S816.

In step S813, the CPU 21A sets flag XHUMI to 0. In other words, it prohibits the execution of the misstep prevention control.

In step S814, the CPU 21A sets the counter CRETRY to 0. In other words, the counter CRETRY is reset.

In step S815, the CPU 21A increments the counter CRETRY by the following equation.

$$CRETRY = CRETRY + 1 \tag{10}$$

In step S816, the CPU 21A determines whether the driver's request to drive over a step is on. Determination of whether the driver's request to drive over a step is on may be made, for example, by providing a release switch and determining whether the driver has turned on the release switch. In addition, it may also determine whether the driver's request to drive over a step is on by whether the driver has operated a turn signal. This is because if the driver operates the turn signal, it is assumed that the driver intends to drive the vehicle 100 up onto the shoulder where there is a step, for example. Then, if the driver's request to drive over a step is on, the process proceeds to step S818, and if the driver's request to drive over a step is off, the process proceeds to step S817.

In step S817, the CPU 21A determines whether the counter CXHUMI has exceeded a predetermined time. The predetermined time is set to 10 seconds in the present embodiment as an example, but it is not limited to this. Then, if the counter CXHUMI exceeds the predetermined time, the process proceeds to step S818, and if the counter CXHUMI is less than the predetermined time, the present routine ends.

In step S818, the CPU 21A sets the flag XHUMI to 0. In other words, it prohibits the execution of the misstep prevention control.

In step S819, the CPU 21A sets the counter CXHUMI to 0. In other words, the counter CXHUMI is reset.

In this way, permission to execute the misstep prevention control is accepted until one second has elapsed after the accelerator pedal is operated. In addition, if it is determined that the vehicle 100 is stopped due to the accelerator pedal being off, etc., the execution of the misstep prevention control is prohibited. For example, when a wheel is stuck in a hole and the driver wants to escape, or when there is an obstacle in front of the vehicle and the driver wants to get over it, or when the driver wants to get over a bump on the shoulder for parallel parking, etc., the driver must prohibit the misstep prevention control and restore the control of torque by accelerator pedal operation.

Note that if the accelerator pedal is pressed again after the accelerator pedal operation has been turned off and the pedal misstep prevention control has been prohibited, it may be assumed that the driver wants to release the accelerator pedal and the pedal misstep prevention control may be prohibited again.

Next, the details of the step estimation process in step S201 of FIG. 6 are explained with reference to FIG. 15.

In step S900, the CPU 21A determines whether the flag XHUMI is 1, i.e., whether the execution of the misstep prevention control is permitted. Then, if the flag XHUMI is 1, i.e., if the misstep prevention control is permitted, the process proceeds to step S901, and if flag XHUMI is 0, i.e., if the misstep prevention control is prohibited, the present routine ends.

In step S901, the CPU 21A calculates a maximum value $h_{max}$ of the height h of the step. Specifically, a vertical load Fz is first calculated. The vertical load Fz is the force applied downward to the wheels 111 and 112, which are the non-driven wheels. The vertical load Fz is calculated by the following equation as the sum of the forces received by each of the wheels 111 and 112.

$$F_Z = mg\left(\frac{l_r}{l} - \frac{G_x h_{cg}}{l}\right) + d_s V_{spd} \tan\theta_{old} \tag{11}$$

The m in the first term on the right side of equation (11) above is the weight of the vehicle 100. The g is an acceleration of gravity. The 1 is the length of the wheelbase of the vehicle 100. The lr is the length from the center of gravity of the vehicle 100 to the center axis of rotation of the rear wheels (wheels 121 and 122) along the front-rear direction. he $G_X$ is the acceleration along the direction of travel of the vehicle 100, i.e., forward, and backward. The $h_{eg}$ is the height from the road surface to the center of gravity of the vehicle 100. The first term on the right side of equation (11) above represents the downward component of the force applied to each of the wheels 111 and 112 as a dynamic load when the vehicle 100 travels.

The $d_S$ in the second term on the right side of equation (11) above is a damping coefficient of a damper (not shown) of the vehicle 100. The $V_{spd}$ is the travel speed along the front/rear direction of the vehicle 100. The Vs can be calculated based on signals from the wheel speed sensor 201, for example. The $\theta_{old}$ is a value of a trajectory angle θ calculated in the previous control cycle. When the process in FIG. 15 is first executed, for example, 0 is used as the value of the $\theta_{old}$. The second term on the right side of equation (11) above represents the force applied to each of the wheels 111 and 112 as the damper expands and contracts.

Next, the trajectory angle θ is calculated. Here, the trajectory angle θ is explained. The trajectory angle is an angle that the trajectory of the center axis of rotation of the wheel 111, etc. makes with respect to the road surface.

Figure 16:
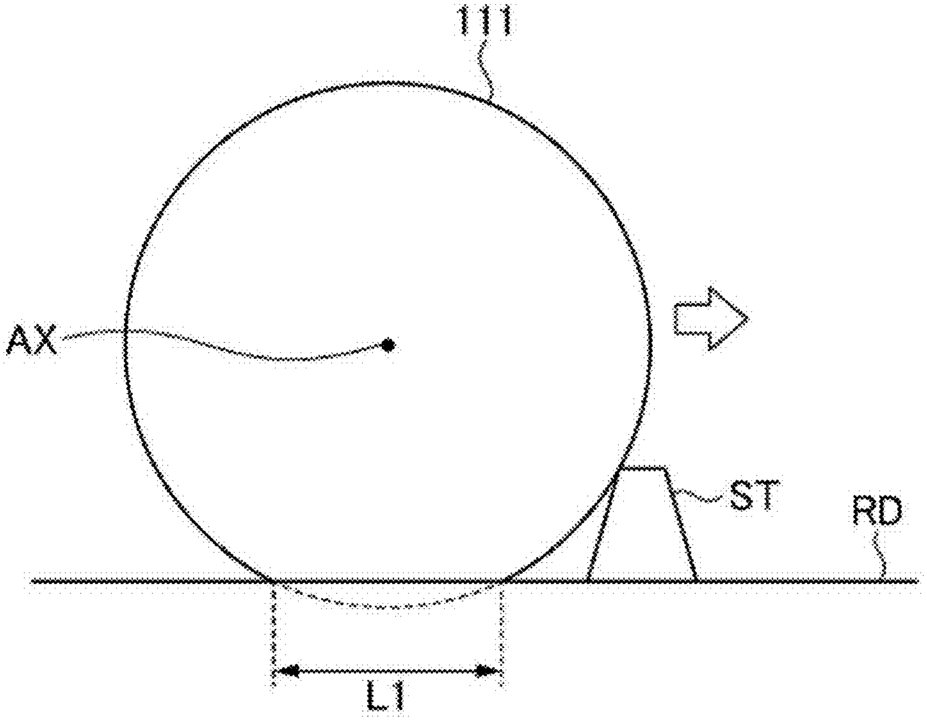
FIG. 16 shows a diagram of a wheel contacting a step.

FIG. 16 schematically depicts the wheel 111 on the road surface RD. The road surface RD is provided with a step ST, which is a wheel stop, and a part of the wheel 111 is in contact with the step ST. f the vehicle 100 attempts to travel further toward the right side (i.e., toward the step ST) from the state shown in FIG. 16, the wheel 111 will drive over the step ST.

Figure 17A:
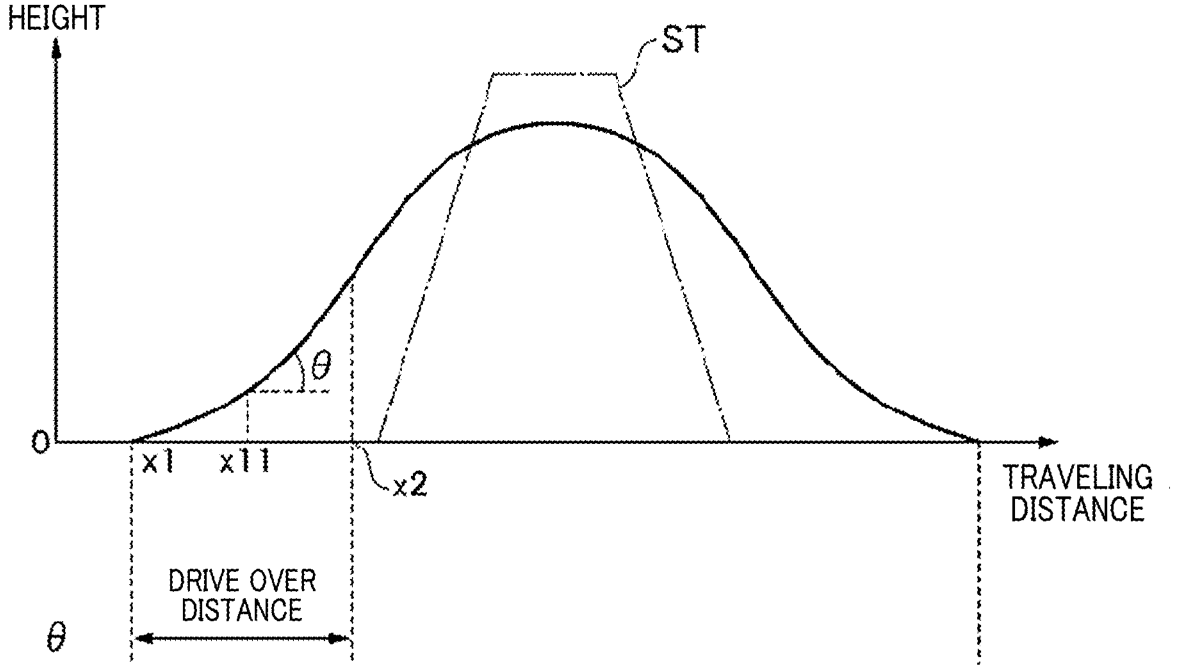
FIG. 17A shows a graph of a trajectory of the wheel's center axis of rotation.

The graph shown by the solid line in FIG. 17A represents the relationship between the distance traveled by the vehicle 100 (horizontal axis) and the height of the center axis of rotation AX of the wheel 111 (vertical axis) when the vehicle 100 travels toward the right side as described above. The graph can be said to represent the trajectory of the center axis of rotation AX while the vehicle 100 is traveling. θ shown in FIG. 17A is an angle that the trajectory of the center axis of rotation AX of the wheel 111 or the like makes with respect to the road surface, and represents the trajectory angle when the vehicle 100 is at position X1. Such a trajectory angle θ can be defined for each position of the vehicle 100.

Note that the trajectory angle is an angle that the trajectory of the center axis of rotation AX of the wheel 111, etc. makes with respect to the road surface, as described earlier. However, the trajectory of the center axis of rotation AX here refers to the trajectory of the center axis of rotation AX when the vehicle 100 is viewed along its right and left directions (vehicle width direction). The trajectory of the center axis of rotation AX, as shown in the graph in FIG. 17A, reflects to some extent the shape of the step ST, indicated by the single-dotted line in the same figure. The reason why the shapes of both wheels are different from each other is that the wheel 111 is not rigid and the wheel 111 deforms when it hits the step ST.

The trajectory angle θ can be calculated by the following equation.

$$\theta = a\sin\left(\frac{mg * Gx - \frac{Tmg}{R}\cos\theta_{old}}{F_Z}\right) \tag{12}$$

The $T_{mg}$ on the right side of equation (12) above is the torque of the rotary motor 150, and R is the dynamic radius of the wheel 111. The $T_{mg}/R$ indicates the torque applied to the road surface by the driven wheels of the vehicle 100. The torque $T_{mg}$ of the rotating electric machine 150 can be obtained, for example, by acquiring the value of the drive electric current flowing through the rotating electric machine 150 with the electric current sensor 203 and calculating the torque based on the magnitude of the acquired drive electric current.

Next, a trajectory angle θ' is calculated from the trajectory angle θ when the wheel 111 is an ideal disk by the following equation.

$$\theta' = \frac{\pi}{2} + \theta - a\cos\left(\frac{L}{2R}\right) \tag{13}$$

Here, L is the ground length of the wheel 111. The ground length L is a drive over distance (x2-x1) in FIGS. 17A and 17B. The graph in FIG. 17B shows an example of the change in the trajectory angle θ when the vehicle 100 drives over the step ST as shown in FIG. 17A.

Figure 17B:
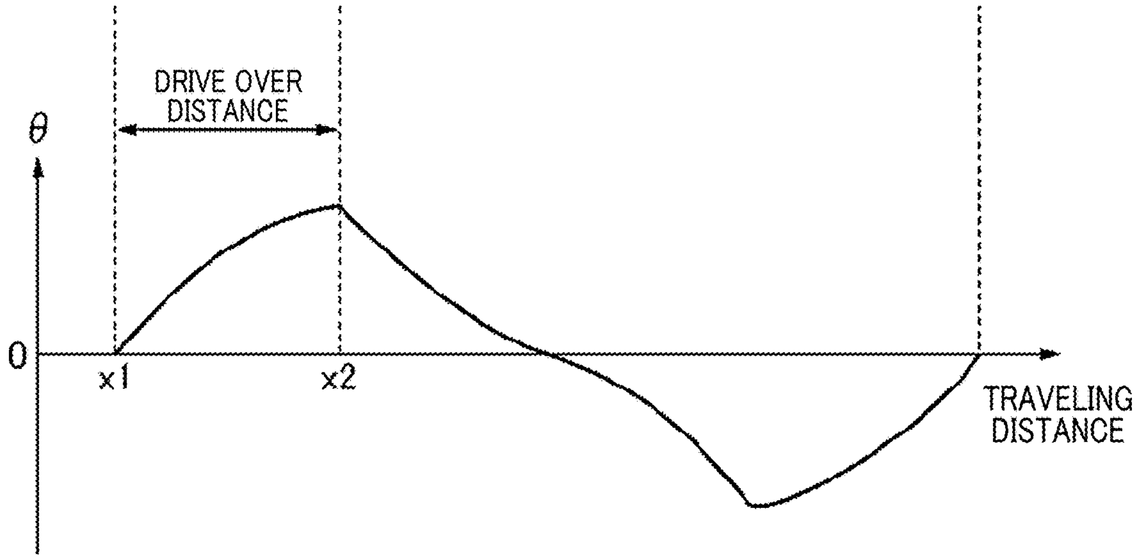
FIG. 17B shows a graph of a trajectory angle.

The X1 shown in FIGS. 17A and 17B is a position of the vehicle 100 at the point when the wheels 111, etc. contact the step ST. In addition, the X2 shown in FIGS. 17A and 17B is a position of the vehicle 100 at the point when the wheels 111, etc. leave the road surface. The position concerned is the one corresponding to an inflection point in the graph in FIG. 17A and a peak value in the graph in FIG. 17B.

The drive over distance is a distance from X1 to X2, i.e., a distance the vehicle 100 travels between the time the wheels 111, etc. contact the step ST and the time the wheels 111, etc. leave the road surface. In other words, the drive over distance can be defined as the distance traveled by the vehicle 100 during the period from when the trajectory angle θ begins to increase until it begins to decrease.

The drive over distance defined in this way is correlated with the length (L1 in FIG. 16) along the front-back direction of the portion of the wheel 111, etc. that is in contact with the road surface RD when the vehicle 100 is stopped on a flat road surface RD. Therefore, the lower the air pressure of wheel 111 and other wheels, the longer L1 shown in FIG. 16, and the longer the drive over distance shown in FIGS. 17*a* and 17*b* tend to be.

The height h of the step ST can be calculated by the following equation if the wheel 111 is an ideal disk.

$$h = R - R_{cos}\theta' = R\left(1 - \sin\left(a\cos\frac{L}{2R}\right) - \theta\right)\Big) \quad (14)$$

If θ in the above equation (14) is set to $\theta_{max}$, the maximum value of the trajectory angle θ, the maximum value of the height of the step ST, $h_{max}$, can be calculated.

The trajectory angle $\theta_{max}$ can be calculated by the following equation.

$$\theta_{max} = \kappa \times L \quad (15)$$

Here, κ is the rate of change of the trajectory angle θ, which can be calculated by the following equation.

$$\kappa = \frac{d\theta}{dx} = \text{filter}\left(\frac{\frac{d\theta}{dt}}{\frac{dx}{dt}}\right) = \text{filter}\left(\frac{\theta}{V_X}, 2\,\text{Hz}\right) \quad (16)$$

Here, filter ( ) is a function that performs filter processing to attenuate high-frequency components and has the function of moderating, or slowing down, the amount of change in the trajectory angle θ. In addition, $V_x$ is the vehicle speed.

From the above, the maximum value $h_{max}$ of the height of step ST can be calculated by the following equation.

$$h_{max} = R\left(1 - \sin\left(a\cos\left(\frac{L}{2R}\right) - \text{filter}\left(\frac{\theta}{V_X}, 2\,\text{Hz}\right) \times L\right)\right) \quad (17)$$

Note that in the following, the maximum height of step ST, $h_{max}$, is simply referred to as the height h of step ST.

Figure 18:
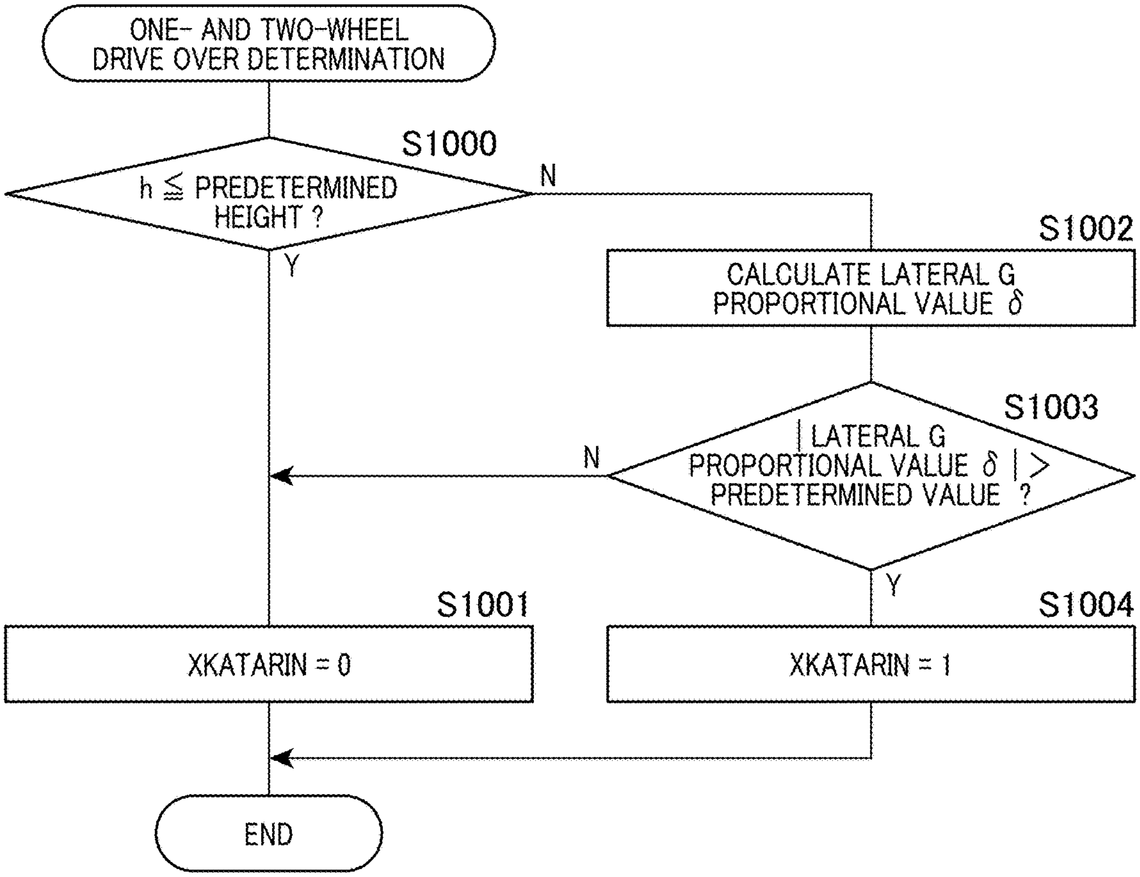
FIG. 18 shows a flowchart of a single-wheel and double-wheel drive over decision process.

In step S902, the CPU 21A executes the one- and two-wheel drive over determination process shown in FIG. 18.

As shown in FIG. 18, in step S1000, the CPU 21A determines whether the step height h calculated in step S901 of FIG. 15 is less than or equal to the predetermined height. The predetermined height is set at 2 cm as an example in the present embodiment, but it is not limited to this. Then, if the step height h is less than or equal to the predetermined height, the process proceeds to step S1001, and if the step height h is higher than the predetermined height, the process proceeds to step S1002.

In step S1001, the flag XKATARIN is set to 0 to indicate whether one wheel is about to drive over a step ST or both wheels are about to drive over a step ST. If the flag XKATARIN is 0, it indicates that both wheels are about to drive over a step ST, and if the flag XKATARIN is 1, it indicates that one wheel is about to drive over a step ST.

In step S1002, the CPU 21A calculates the lateral G proportional value δ using the following equation.

$$\delta = \frac{G_y * K}{\max(V_x \cdot r,\ const)} \quad (18)$$

Here, $G_y$ is the lateral G, i.e., the acceleration along the left and right directions of the vehicle 100, and can be obtained from the acceleration sensor 202. K is a predetermined coefficient. In addition, $V_x$ is the vehicle speed. Further, r is the yaw rate, which can be obtained from the yaw rate sensor 210. Furthermore, const is a predetermined coefficient that prevents the denominator from being zero.

If one wheel drives over on the step ST, the vehicle 100 tilts more than when both wheels drive over, so it is detected as a lateral G. In order to cancel the portion of lateral G generated when the vehicle 100 is turning, the it is determined whether one or both wheels are about to drive over the step ST based on the lateral G proportional value δ, which is calculated from the lateral G and the yaw rate r, to determine whether one wheel is about to drive over the step ST.

In step S1003, the CPU 21A determines whether the absolute value of the lateral G proportional value δ calculated in step S1002 is greater than a predetermined value. Then, if the absolute value of the lateral G proportional value δ is greater than the predetermined value, the process proceeds to step S1004, and if the absolute value of the lateral G proportional value δ is less than the predetermined value, the process proceeds to step S1001.

In step S1004, the CPU 21A sets flag XKATARIN to 1.

Returning to FIG. 15, in step S903, the CPU 21A determines whether the flag XKATARIN is 0. In other words, it is determined whether both wheels are about to drive over a step STt. Then if the flag XKATARIN is 0, the present process ends, and if flag XKATARIN is 1, the process proceeds to step S904.

In step S904, the CPU 21A doubles the height h of the step ST by the following equation. In other words, if one wheel is about to drive over the step ST, the height h of the step ST is set to twice the height of the step ST.

$$h = h \times 2 \quad (19)$$

Next, the details of the step S202 in FIG. 6 for the step S202 misstep prevention control are explained with reference to FIG. 19. In the following, a case where the gear shift is in D range (drive) is explained.

In step S1100, the CPU 21A determines whether the flag XHUMI is 1. In other words, it is determined whether the execution of the misstep prevention control is permitted. The, if the flag XHUMI is 1, i.e., execution of the misstep prevention control is permitted, the process proceeds to step S1101, and if the flag XHUMI is 0, i.e., execution of the misstep prevention control is prohibited, the process proceeds to step S1108.

In step S1101, the CPU 21A determines whether the vehicle speed is less than or equal to a predetermined speed. he predetermined speed is set to a speed at which the vehicle 100 can be determined to be traveling at a low speed, and in the present embodiment, it is set to 1 kph as an example, but it is not limited to this.

The, if the vehicle speed is less than or equal to the predetermined speed, the process proceeds to step S1102, and if the vehicle speed exceeds the predetermined speed, the process proceeds to step S1104.

In step S1102, the CPU 21A determines whether the height h of the step ST is higher than a first predetermined height. The first predetermined height is set at 13.5 cm as an example in the present embodiment, but it is not limited to this. Then, if the height h of the step ST is higher than the first predetermined height, the process proceeds to step S1103, and if the height h of the step ST is less than or equal to the first predetermined height, the process proceeds to step S1104.

Figure 20:
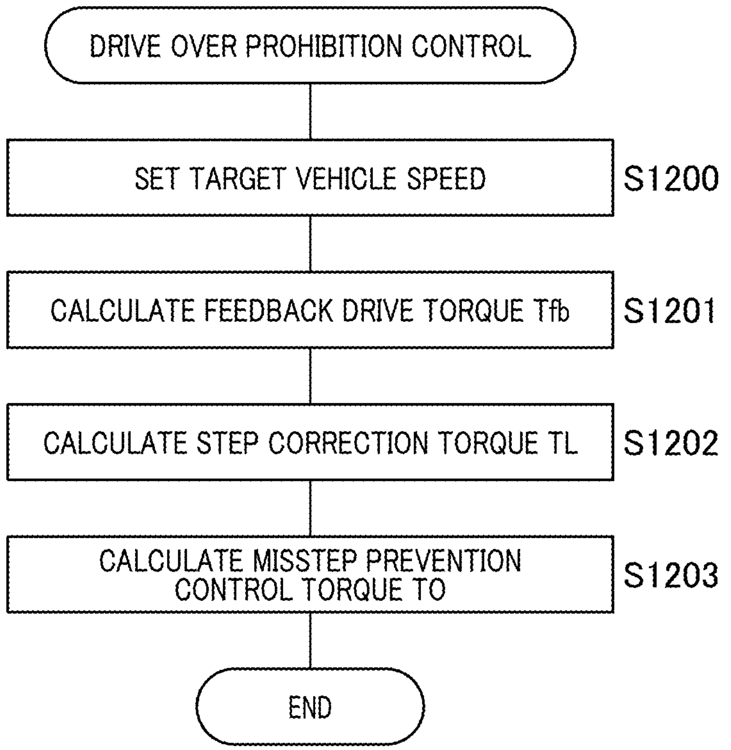
FIG. 20 shows the flowchart of a drive over prohibition control.

In step S1103, the CPU 21A executes the drive over prohibition control shown in FIG. 20.

As shown in FIG. 20, in step S1200, the CPU 21A sets a target vehicle speed. The target vehicle speed is set to 0 kph as an example, but it is not limited to this.

In step S1201, the CPU 21A calculates a feedback drive torque Tfb for PI feedback control so that the vehicle speed becomes the target vehicle speed set in step S1200 using the following equation.

$$Tfb = Kp \times e + Ki \times \int e \tag{20}$$

Here Kp is the proportional gain. Ki is the integral gain. In addition, Tfb is limited between a predetermined upper and lower limit.

In step S1202, the CPU 21A sets a step correction torque TL that cancels the load torque according to the height h of the step ST. Here, TL is set to 0 when the target vehicle speed is 0 kph.

In step S1203, the CPU 21A calculates the misstep prevention control torque TO by the following equation.

$$TO = Tfb + TL + TU \tag{21}$$

Here, TU is the torque set according to the gradient of the road surface, and can be obtained using the gradient torque map data 23D, which has a predetermined correspondence relationship between the gradient and torque TU.

Note that the drive over prohibition control in FIG. 20 is executed when the gear shift is in R range (reverse) as well as when the gear shift is in D range.

Returning to FIG. 19, in step S1104, the CPU 21A determines whether the height h of the step ST is higher than a second predetermined height. The second predetermined height is set at a lower height than the first predetermined height, which in the present embodiment is set at 6.5 cm as an example, but it is not limited to this. Then, if the height h of the step ST is higher than the second predetermined height, the process proceeds to step S1105, and if the height h of the step ST is less than or equal to the second predetermined height, the process proceeds to step S1108.

In step S1105, the CPU 21A executes low-speed drive over control. The low-speed drive over control is basically the same as the drive over prohibition control in FIG. 20, but the processing in steps S1200 and S1202 is different.

First, the target vehicle speed set in step S1200 is different. In the low-speed drive over control, the target vehicle speed is set at 1 kph, for example, but not limited to this.

In addition, in step S1202, the step correction torque TL is calculated by the following equation.

$$TL = R \times Fz \times \tan(\theta) \tag{22}$$

Note that the low-speed drive over control in the case where the gear shift is in R range (reverse) is the same as in the case where the gear shift is in D range, except that the target vehicle speed is set to −1 kph in step S1200.

Returning to FIG. 19, in step S1106, the CPU 21A sets the step drive over control flag XEX to 1. If the step drive over control flag XEX is 1, it indicates that torque compensation by the misstep prevention control torque TO is being executed, i.e., the step drive over control of step S1103 or the low-speed drive over control of step S1105 is being executed. On the other hand, if the step drive over control flag XEX is 0, it indicates that the torque correction by the misstep prevention control torque TO is not being executed, i.e., neither the drive over prohibition control in step S1103 nor the low-speed drive over control in step S1105 is being executed.

In step S1107, the CPU 21A executes a process of warning the driver. Specifically, for example, a message such as, "Please release the pedal and stop the vehicle." or other messages are displayed on a dashboard, or messages are output from a speaker by voice.

Figure 21:
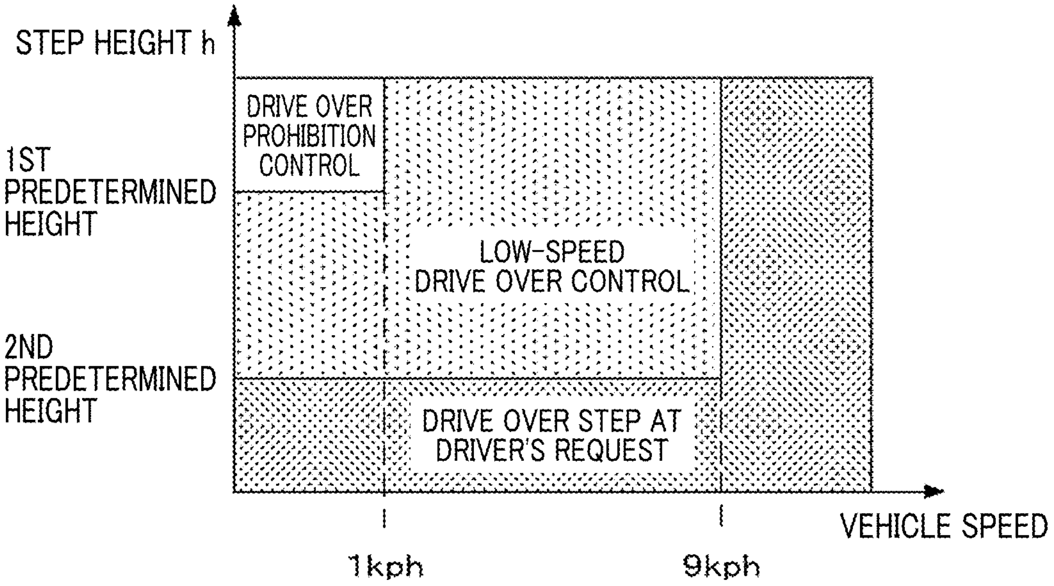
FIG. 21 shows the relationship between a vehicle speed, a step height, and the step drive over control.

FIG. 21 shows the relationship between the vehicle speed, the step height h, and the step drive over control. As shown in FIG. 21, if the vehicle speed is less than or equal to the first speed (1 kph) and the step height h is higher than the first predetermined height, the drive over prohibition control is performed. In addition, if the vehicle speed is faster than the second speed (9 kph) or if the step height h is less than or equal to the second predetermined height, the control is performed to drive over the step at the driver's request. Further, if the vehicle speed is less than 9 kph and the step height h is higher than the second predetermined height and less than or equal to the first predetermined height, or if the vehicle speed is faster than 1 kph and less than or equal to 9 kph and the step height h is higher than the first predetermined height, the low-speed drive over control is performed at 1 kph to drive over the step.

As explained above, in the present embodiment, if the temperature of the rotating electric machine 150 rises above the first threshold value for which the protective control should be executed during the execution of the step drive over control, the execution of the protective control is deferred until a predetermined time elapses. The, if the temperature of the rotating electric machine 150 is greater than the second threshold value, which is greater than the first threshold value, the protection control torque is set so that the speed of the vehicle 100 is less than or equal to the predetermined speed. This can suppress hunting, in which the state in which the torque is limited and the state in which the torque is unlimited are repeated, thereby preventing drivability from deteriorating. In addition, it also prevents the vehicle from not being able to drive over the step or the vehicle 100 from popping out after overriding the step due to the torque limitation, allowing the vehicle to drive over the step smoothly.

It should be appreciated that the present disclosure is not limited to the above-described embodiments, and various variations and applications are possible within the scope that does not depart from the main purpose of the present disclosure.

Needless to say that the configuration of the vehicle control device 10 (refer to FIG. 2) described in the above embodiment is an example, and unnecessary parts may be deleted or new parts may be added to the extent not to depart from the main purpose of the present disclosure.

In addition, needless to say that the process flow of the vehicle control program 23A described in the above embodiment (refer to FIGS. 5-7) is also an example, and unnecessary steps may be deleted, new steps may be added, or the order of processing may be replaced to the extent not to depart from the main purpose of the present disclosure.

The control unit and methods described in the present disclosure may be realized by a dedicated computer comprising a processor programmed to perform one or more functions embodied by a computer program. Alternatively, the devices and methods described in the present disclosure may be realized by a dedicated computer, where the processor is configured by dedicated hardware logic circuits. Alternatively, the devices and methods described in the present disclosure may be realized by one or more dedicated computers composed of a processor executing a computer program in combination with one or more hardware logic circuits. Further, the computer program may also be stored in a computer-readable, non-transitory storage media as instructions to be executed by a computer.

The following appendix is disclosed with respect to the technology of the present disclosure.

APPENDIX (Appendix 1)

A vehicle control device including:

a step drive over control section configured to perform a step drive over control for a vehicle to drive over a step, a protection control section configured to perform a protection control to protect a rotating electric machine that drives the vehicle by suppressing the rotating electric machine from overheating, a temperature acquisition section configured to acquire the temperature of the rotating electric machine, and an execution deferment section configured to defer execution of the protection control until a predetermined period has elapsed if the temperature of the rotating electrical machine becomes equal to or higher than a first threshold value at which the protection control should be executed while the vehicle is performing the step drive over control.

(Appendix 2)

The vehicle control device according to appendix 1, further including:

a speed acquisition section configured to acquire a speed of the vehicle, wherein if the temperature of the rotating electric machine exceeds the first threshold value, the protection control section sets a protection control torque to be applied to the rotating electric machine so that the speed of the vehicle becomes a target vehicle speed.

(Appendix 3)

The vehicle control device according to appendix 2, wherein if the temperature of the rotating electric machine becomes equal to or higher than a second threshold value, which is higher than the first threshold value, the protection control section sets the protection control torque so that the speed of the vehicle becomes equal to or lower than the predetermined speed.

(Appendix 4)

The vehicle control device according to appendix 1, wherein the rotating electric machine is a three-phase motor generator, and the temperature acquisition section estimates the temperature based on an electric current value of an electric current flowing in the three-phase motor generator.

(Appendix 5)

The vehicle control device according to appendix 4, wherein if the vehicle is traveling below a predetermined speed and the motor generator is continuously energized, the temperature acquisition section estimates the temperature so that a rate of increase of the temperature is higher than that estimated when the vehicle is traveling above the predetermined speed.

(Appendix 6)

The vehicle control device according to appendix 2, wherein the step drive over control section performs:

a drive over prohibition control to prohibit the vehicle from overriding the step if the speed of the vehicle is equal to or less than a first speed and the step is higher than a first predetermined height, execute the control of overriding the step at a request of a driver of the vehicle if the speed of the vehicle is faster than a second speed, which is faster than the first speed, or if the height of the step is equal to or lower than a second predetermined height, which is lower than the first predetermined height, perform a low-speed drive over control to drive over the step at the first speed if the speed of the vehicle is less than or equal to the second speed and the height of the step is higher than the second predetermined height and less than or equal to the first predetermined height, if the speed of the vehicle is faster than the first speed and less than or equal to the second speed, and if the height of the step is higher than the first predetermined height.

(Appendix 7)

A vehicle control method, wherein at least one processor performs a process including:

performing a step drive over control for a vehicle to drive over a step, performing a protection control to protect a rotating electric machine that drives the vehicle by suppressing the rotating electric machine from overheating, acquiring the temperature of the rotating electric machine, and deferring an execution of the protection control until a predetermined period has elapsed if the temperature of the rotating electrical machine becomes equal to or higher than a first threshold value at which the protection control should be executed while the vehicle is performing the step drive over control.

(Appendix 8)

A vehicle control program that causes at least one processor to perform processing including:

performing a step drive over control for a vehicle to drive over a step, performing a protection control to protect a rotating electric machine that drives the vehicle by suppressing the rotating electric machine from overheating, acquiring the temperature of the rotating electric machine, and deferring an execution of the protection control until a predetermined period has elapsed if the temperature of the rotating electrical machine becomes equal to or higher than a first threshold value at which the protection control should be executed while the vehicle is performing the step drive over control.

(Appendix 9)

A vehicle control device including:

one or more processors;

a memory storing instructions that when executed by the one or more processors causes the vehicle control device to perform processes comprising:

a step drive over control process which performs a step drive over control for a vehicle to drive over a step, a protection control process which performs a protection control to protect a rotating electric machine that drives the vehicle by suppressing the rotating electric machine from overheating, a temperature acquisition process which acquires the temperature of the rotating electric machine, and an execution deferment process which defers an execution of the protection control until a predetermined period has elapsed if the temperature of the rotating electrical machine becomes equal to or higher than a first threshold value at which the protection control should be executed while the vehicle is performing the step drive over control.

What is claimed is:

1. A vehicle control device comprising:

a step drive over control section configured to perform a step drive over control for a vehicle to drive over a step;

a protection control section configured to perform a protection control to protect a rotating electric machine that drives the vehicle by suppressing the rotating electric machine from overheating;

a temperature acquisition section configured to acquire temperature of the rotating electric machine;

an execution deferment section configured to defer execution of the protection control until a predetermined period has elapsed if the temperature of the rotating electrical machine becomes equal to or higher than a first threshold value at which the protection control should be executed while the vehicle is performing the step drive over control; and a speed acquisition section configured to acquire a speed of the vehicle, wherein if the temperature of the rotating electric machine exceeds the first threshold value, the protection control section sets a protection control torque to be applied to the rotating electric machine so that the speed of the vehicle becomes a target vehicle speed, and the step drive over control section:

performs a drive over prohibition control to prohibit the vehicle from overriding the step if the speed of the vehicle is equal to or less than a first speed and the step is higher than a first predetermined height;

executes the control of overriding the step at a request of a driver of the vehicle if the speed of the vehicle is faster than a second speed, which is faster than the first speed, or if the height of the step is equal to or lower than a second predetermined height, which is lower than the first predetermined height; and performs a low-speed drive over control to drive over the step at the first speed if the speed of the vehicle is less than or equal to the second speed and the height of the step is higher than the second predetermined height and less than or equal to the first predetermined height, if the speed of the vehicle is faster than the first speed and less than or equal to the second speed, and if the height of the step is higher than the first predetermined height.

2. The vehicle control device according to claim 1, wherein if the temperature of the rotating electric machine becomes equal to or higher than a second threshold value, which is higher than the first threshold value, the protection control section sets the protection control torque so that the speed of the vehicle becomes equal to or lower than the predetermined speed.

3. A vehicle control device comprising:

a step drive over control section configured to perform a step drive over control for a vehicle to drive over a step;

a protection control section configured to perform a protection control to protect a rotating electric machine that drives the vehicle by suppressing the rotating electric machine from overheating;

a temperature acquisition section configured to acquire temperature of the rotating electric machine; and an execution deferment section configured to defer execution of the protection control until a predetermined period has elapsed if the temperature of the rotating electrical machine becomes equal to or higher than a first threshold value at which the protection control should be executed while the vehicle is performing the step drive over control, wherein, the rotating electric machine is a three-phase motor generator;

the temperature acquisition section estimates the temperature based on an electric current value of an electric current flowing in the three-phase motor generator; and if the vehicle is traveling below a predetermined speed and the three-phase motor generator is continuously energized, which is a state where a single phase among the three-phases is continuously energized, the temperature acquisition section estimates the temperature so that a rate of increase of the temperature is higher than that estimated when the vehicle is traveling above the predetermined speed.

4. A vehicle control method performed by at least one processor, the method comprising:

performing a step drive over control for a vehicle to drive over a step;

performing a protection control to protect a rotating electric machine that drives the vehicle by suppressing the rotating electric machine from overheating;

acquiring temperature of the rotating electric machine; and deferring execution of the protection control until a predetermined period has elapsed if the temperature of the rotating electrical machine becomes equal to or higher than a first threshold value at which the protection control should be executed while the vehicle is performing the step drive over control; and acquiring a speed of the vehicle, wherein the method further comprises:

if the temperature of the rotating electric machine exceeds the first threshold value, setting a protection control torque to be applied to the rotating electric machine so that the speed of the vehicle becomes a target vehicle speed;

prohibiting the vehicle from overriding the step if the speed of the vehicle is equal to or less than a first speed and the step is higher than a first predetermined height;

overriding the step at a request of a driver of the vehicle if the speed of the vehicle is faster than a second speed, which is faster than the first speed, or if the height of the step is equal to or lower than a second predetermined height, which is lower than the first predetermined height; and driving over the step at the first speed if the speed of the vehicle is less than or equal to the second speed and the height of the step is higher than the second predetermined height and less than or equal to the first predetermined height, if the speed of the vehicle is faster than the first speed and less than or equal to the second speed, and if the height of the step is higher than the first predetermined height.

5. A non-transitory computer-readable medium storing a vehicle control program that causes at least one processor to perform processing comprising:

performing a step drive over control for a vehicle to drive over a step;

performing a protection control to protect a rotating electric machine that drives the vehicle by suppressing the rotating electric machine from overheating;

acquiring temperature of the rotating electric machine;

deferring execution of the protection control until a predetermined period has elapsed if the temperature of the rotating electrical machine becomes equal to or higher than a first threshold value at which the protection control should be executed while the vehicle is performing the step drive over control; and acquiring a speed of the vehicle, wherein the processing further comprises:

if the temperature of the rotating electric machine exceeds the first threshold value, setting a protection control torque to be applied to the rotating electric machine so that the speed of the vehicle becomes a target vehicle speed;

prohibiting the vehicle from overriding the step if the speed of the vehicle is equal to or less than a first speed and the step is higher than a first predetermined height;

overriding the step at a request of a driver of the vehicle if the speed of the vehicle is faster than a second speed, which is faster than the first speed, or if the height of the step is equal to or lower than a second predetermined height, which is lower than the first predetermined height; and driving over the step at the first speed if the speed of the vehicle is less than or equal to the second speed and the height of the step is higher than the second predetermined height and less than or equal to the first predetermined height, if the speed of the vehicle is faster than the first speed and less than or equal to the second speed, and if the height of the step is higher than the first predetermined height.

6. A vehicle control device comprising:

one or more processors;

a memory storing instructions that, when executed by the one or more processors, cause the vehicle control device to perform processes comprising:

a step drive over control for a vehicle to drive over a step;

performing a protection control to protect a rotating electric machine that drives the vehicle by suppressing the rotating electric machine from overheating;

acquiring temperature of the rotating electric machine; and deferring execution of the protection control until a predetermined period has elapsed if the temperature of the rotating electrical machine becomes equal to or higher than a first threshold value at which the protection control should be executed while the vehicle is performing the step drive over control; and acquiring a speed of the vehicle, wherein the processes further comprise:

if the temperature of the rotating electric machine exceeds the first threshold value, setting a protection control torque to be applied to the rotating electric machine so that the speed of the vehicle becomes a target vehicle speed;

prohibiting the vehicle from overriding the step if the speed of the vehicle is equal to or less than a first speed and the step is higher than a first predetermined height;

overriding the step at a request of a driver of the vehicle if the speed of the vehicle is faster than a second speed, which is faster than the first speed, or if the height of the step is equal to or lower than a second predetermined height, which is lower than the first predetermined height; and driving over the step at the first speed if the speed of the vehicle is less than or equal to the second speed and the height of the step is higher than the second predetermined height and less than or equal to the first predetermined height, if the speed of the vehicle is faster than the first speed and less than or equal to the second speed, and if the height of the step is higher than the first predetermined height.

* * * * *